United States Patent
Rietman et al.

(10) Patent No.: US 10,374,797 B2
(45) Date of Patent: Aug. 6, 2019

(54) PUBLIC-KEY ENCRYPTION SYSTEM

(71) Applicant: KONINKLIJKE PHILIPS N.V., Eindhoven (NL)

(72) Inventors: Ronald Rietman, Eindhoven (NL); Oscar Garcia-Morchon, Aachen (DE); Ludovicus Marinus Gerardus Maria Tolhuizen, Waalre (NL); Santos Merino Del Pozo, Santander (ES)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 168 days.

(21) Appl. No.: 15/512,938

(22) PCT Filed: Sep. 22, 2015

(86) PCT No.: PCT/EP2015/071779
§ 371 (c)(1),
(2) Date: Mar. 21, 2017

(87) PCT Pub. No.: WO2016/046227
PCT Pub. Date: Mar. 31, 2016

(65) Prior Publication Data
US 2018/0034630 A1    Feb. 1, 2018

(30) Foreign Application Priority Data

Sep. 24, 2014   (NL) ...................... 2013520

(51) Int. Cl.
*H04L 9/00*  (2006.01)
*H04L 9/08*  (2006.01)
(Continued)

(52) U.S. Cl.
CPC .............. *H04L 9/0869* (2013.01); *H04L 9/14* (2013.01); *H04L 9/3093* (2013.01)

(58) Field of Classification Search
CPC ....... H04L 9/3093; H04L 9/0869; H04L 9/14; H04L 1/1812; H04L 5/14; H04W 72/0413;
(Continued)

(56) References Cited

U.S. PATENT DOCUMENTS

2008/0069346 A1*  3/2008  Rubin ................... H04L 9/0841
                                                        380/44
2010/0058059 A1*  3/2010  Schneider ............. H04L 9/3026
                                                        713/171

(Continued)

FOREIGN PATENT DOCUMENTS

EP    2667539 A1   11/2013
JP    H0637749 A    2/1994
(Continued)

OTHER PUBLICATIONS

Using Bivariate Polynomial to Design a Dynamic Key Management Scheme for Wireless Sensor Networks, Chin-Ling Chen, Yu-Ting Tsai, Aniello Castiglione and Francesco Palmieri, Department of Computer Science and Information Engineering Chaoyang University of Technology, Taichung, 41349, Taiwan, Apr. 2013 (Year: 2013).*

(Continued)

*Primary Examiner* — Gary S Gracia

(57) ABSTRACT

A key generation device (100) configured to generate a public key (126) for use in a public key encryption device and a corresponding private key (114) for use in a private key decryption device, the key generation device comprising a private key generator (110) configured for obtaining in electronic form a private random value (112, s), and generating the private key (114), the private key comprising the private random value (112), and a public key generator (120) configured for obtaining in electronic form a public set of bivariate polynomials (122, $f_i(,)$), computing a public uni- (Continued)

variate polynomial (124) by summing over univariate polynomials obtained by substituting the private random value (112, s) into the polynomials of the public set (122, $f_i(s,)$), and generating the public key (126), the public key comprising the public univariate polynomial (124) and the public set (122).

10 Claims, 4 Drawing Sheets

(51) Int. Cl.
H04L 9/30 (2006.01)
H04L 9/14 (2006.01)
H04L 17/02 (2006.01)

(58) Field of Classification Search
CPC ......... H04W 72/0446; H04W 72/1268; H04W 72/1289
USPC .................................. 380/47, 255; 713/176
See application file for complete search history.

(56) References Cited

U.S. PATENT DOCUMENTS

| | | | | |
|---|---|---|---|---|
| 2010/0082988 A1* | 4/2010 | Huebner | ................. | H04L 9/083 713/171 |
| 2011/0029778 A1* | 2/2011 | Garcia Morchon | .... | H04L 9/083 713/171 |
| 2011/0033054 A1* | 2/2011 | Garcia Morchon | .... | H04L 9/083 380/279 |
| 2011/0317838 A1* | 12/2011 | Garcia Morchon | .... | H04L 9/085 380/259 |
| 2012/0288086 A1* | 11/2012 | Schaffer | ................. | G06F 7/724 380/28 |
| 2015/0381365 A1* | 12/2015 | Garcia Morchon | .. | H04L 9/0838 380/30 |

FOREIGN PATENT DOCUMENTS

| | | |
|---|---|---|
| JP | 2012503356 A | 2/2012 |
| WO | 2010032158 A2 | 3/2010 |

OTHER PUBLICATIONS

Boucher et al: "Key Exchange and Encryption Schemes Based on Non-Commutative Skew Polynomials"; PQCRYPTO 2010, LNCS 6061, pp. 126-141, 2010.

Ashok Kumar Das: "Improving Identity-Based Random Key Establishment Scheme for Large-Scale Hierarchical Wireless Sensor Networks"; International Journal of Network Security, vol. 14, No. 1, pp. 1-21, Jan. 2012.

Yagisawa et al: "Key Agreement Protocols Based on Multivariate Polynomials"; Downloaded by EPO on May 26, 2011, 3 Page Document.

* cited by examiner

PUBLIC-KEY ENCRYPTION SYSTEM

CROSS-REFERENCE TO PRIOR APPLICATIONS

This application is the U.S. National Phase application under 35 U.S.C. § 371 of International Application No., filed on PCT/EP2015/071779, which claims the benefit of European Patent Application No. N2013520, filed on Sep. 24, 2014. These applications are hereby incorporated by reference herein.

FIELD OF THE INVENTION

The invention relates to a public key encryption system comprising a key generation device. The key generation device is configured to generate a public key for use in a public key encryption device and a corresponding private key for use in a private key decryption device. The key generation device is configured to obtaining in electronic form a private random value.

BACKGROUND OF THE INVENTION

Public-key encryption is a field of cryptography using two separate keys, one of which is secret (private) and one of which is called public. Although different, the two parts of the key pair are mathematically linked. One key locks or encrypts the plaintext to obtain cipher text, and the other unlocks or decrypts the cipher text to obtain the plaintext again. The public key cannot perform the decryption function without the private key. The public key may even be published, and yet an attacker is not helped in decrypting cipher texts. Public-key encryption is also known as asymmetric encryption.

The known algorithms used for public key cryptography are based on mathematical relationships such as the integer factorization and discrete logarithm problems. Although it is computationally easy for the intended recipient to generate the public and private keys, to decrypt the message using the private key, and easy for the sender to encrypt the message using the public key, it is difficult for anyone to derive the private key, based only on their knowledge of the public key. The latter differs from symmetric encryption, in which decryption keys either equal their corresponding encryption key or are easily derived therefrom.

Public-key cryptography is widely used. It is an approach used by many cryptographic algorithms and cryptosystems.

The problems on which known public-key encryption system are based are resource intensive. For example, RSA encryption, which is a known public-key encryption system, requires for key generation, that two large prime number p and q are generated. Decryption requires exponentiation on similar sized numbers.

Reference is made to the article "Key Exchange and Encryption Schemes Based on Non-commutative Skew Polynomials" by Delphine Boucher, et al. The article relates to a key exchange algorithm based on so-called non-commutative skew polynomials.

Reference is further made to the article "Key Agreement Protocols Based on Multivariate Polynomials over Fq" by Yagisawa Masahiro. The article relates to key agreement protocols based on multivariate polynomials that are not evaluated.

SUMMARY OF THE INVENTION

Current public-key encryption (PKE) methods require heavy mathematical operations and thus they are less suitable for embedded systems, such as sensors, which are computationally constrained. It would be advantageous to have an improved system for public key encryption of messages.

An aspect of the invention concerns a system for encrypting messages. The system comprises a key generation device, a public key encryption device and, preferably, a private key decryption device. The key generation device is configured to generate a public key for use in a public key encryption device and a corresponding private key for use in a private key decryption device. The public key encryption device is configured for encrypting an electronic message using a public key. The private key decryption device is configured for decrypting an encrypted message using decryption information and a private key.

In PKE, each party maintains two keys: a public key and a private key. The public key may be published, for instance by a central authority. But, each party keeps its private key secret from any other parties which are not trusted to read communication for that specific party.

The public key encryption provided by the devices in the system allows for efficient operation and is suited for resource-constrained devices. The devices of the system are further explained below.

The public-key encryption may be used in lighting networks, e.g., that require secure communications. In general, the invention can be applied to any type of communication network requiring secure communication between pairs of devices.

The key generation device, public key encryption device and private key decryption device are electronic devices; they may be mobile electronic devices, such as mobile phone, set-top box, computer, and the like. The key generation device, public key encryption device and private key decryption device may be resource-constrained such as a sensor, a lighting device, a LED lamp, a smart card, an RFID tag, and the like.

As aspect of the invention concerns a key generation device configured to generate a public key for use in a public key encryption device and a corresponding private key for use in a private key decryption device. The key generation device comprises a private key generator and a public key generator. The private key generator is configured for obtaining in electronic form a private random value, and generating the private key, the private key comprising the private random value. The public key generator is configured for obtaining in electronic form a public set of bivariate polynomials, computing a public univariate polynomial by summing over univariate polynomials obtained by substituting the private random value into the polynomials of the public set, and generating the public key, the public key comprising the public univariate polynomial and the public set.

In an embodiment of the key generation device, the public set of bivariate polynomials only comprises symmetric bivariate polynomials.

In an embodiment of the key generation device, the public set of bivariate polynomials comprises at least two different bivariate polynomials.

The system may also be used when two bivariate polynomials are the same provided their underlying ring, e.g., a local reduction integer is different.

In an embodiment of the key generation device, at least one polynomial of the public set has a degree of at least two in one of the two variables of said at least one polynomial.

In an embodiment of the key generation device, the public univariate polynomial is represented as a list of coefficients of the public univariate polynomial in a canonical form.

In an embodiment of the key generation device, a different commutative ring is associated with each polynomial of the public set of bivariate polynomials, and wherein the univariate polynomial obtained by substituting the private random value into a particular polynomial of the public set is reduced to a canonical form in the commutative ring associated with the particular univariate polynomial.

In an embodiment of the key generation device, a public global reduction integer is associated with the public set and a public individual reduction integer with each polynomial of the public set, the private random value is an integer, each polynomial in the public set is a bivariate polynomial with integer coefficients, the public univariate polynomial is a univariate polynomials with integer coefficients. The public individual reduction integers are also referred to as local reduction integers.

Is it useful that the public individual reduction integers are all distinct, since if two of them are equal, the public set may be simplified to have fewer polynomials. Nevertheless if some or all of the public individual reduction integers are equal the system would work correctly, although with the security that may be expected from a smaller system having fewer polynomials.

Computing the public univariate polynomial comprises obtaining a set of univariate polynomials by for each polynomial of the public set substituting the private random value into said polynomial and reducing modulo the public individual reduction integer associated with said polynomial, and summing the set of univariate polynomials and reducing modulo the global reduction integer.

In an embodiment of the key generation device, the public global reduction integer is an odd number larger than $2^{(\alpha+2)b-1}$ and/or lower than $2^{(\alpha+2)b}$, wherein $\alpha$ represents the highest degree in one of the two variables of the polynomials in the public set, and b represents a key length, and for each public individual reduction integer, the public global reduction integer minus said public individual reduction integer is a multiple of 2 to the power of the key length ($q_i = N - \beta_i 2^b$, $1 \leq \beta_i < 2^b$) and is less than 2 to the power of twice the key length, and wherein computing the symmetric key further comprises reducing modulo 2 to the power of the key length. In an embodiment of the key generation device, the public global reduction integer is an odd number larger than $2^{(\alpha+2)b-1}$ and lower than $2^{(\alpha+2)b}$.

As aspect of the invention concerns a public key encryption device for encrypting an electronic message using a public key, the public key comprising a public univariate polynomial and a public set of bivariate polynomials. The public key encryption device comprising a symmetric key obtainer, a decryption information generator, and an encryption unit.

The symmetric key obtainer is configured for obtaining in electronic form an encrypting random value, and computing a symmetric key by substituting the encrypting random value in the public univariate polynomial. The symmetric key obtainer may be configured to, not only evaluating the polynomial, but also taking the b least significant bits.

The decryption information generator is configured for computing a decrypting univariate polynomial by summing over univariate polynomials obtained by substituting the encrypting random value into the polynomials of the public set, and generating the decryption information, the decryption information comprising the decrypting univariate polynomial.

The encryption unit is configured for encrypting the message with the symmetric key and associating said encrypted message with the decryption information.

In an embodiment of the public key encryption device, the public set of bivariate polynomials only comprises symmetric bivariate polynomials.

In an embodiment of the public key encryption device, the public set of bivariate polynomials comprises at least two different bivariate polynomials.

In an embodiment of the public key encryption device, at least one polynomial of the public set has a degree of at least two in one of the two variables of said at least one polynomial.

In an embodiment of the public key encryption device, the public univariate polynomial is represented as a list of coefficients of the public univariate polynomial in a canonical form, and/or the decrypting univariate polynomial is represented as a list of coefficients of the decrypting univariate polynomial in a canonical form.

In an embodiment of the public key encryption device, a different commutative ring is associated with each polynomial of the public set of bivariate polynomials, and wherein the univariate polynomial has been obtained by substituting the private random value into a particular polynomial of the public set is reduced to a canonical form in the commutative ring associated with the particular univariate polynomial, and the univariate polynomial is obtained by substituting the encrypting random value into a particular polynomials of the public set is reduced to a canonical form in the commutative ring associated with the particular univariate polynomial.

In an embodiment of the public key encryption device, a public global reduction integer is associated with the public set and a public individual reduction integer with each polynomial of the public set, the encrypting random value is an integer, each polynomial in the public set is a bivariate polynomial with integer coefficients, the public univariate polynomial and decrypting univariate polynomial are univariate polynomials with integer coefficients.

Computing the symmetric key comprises substituting the encrypting random value in the public univariate polynomial and reducing modulo the global reduction integer. Computing the symmetric key may also comprise taking b bits of the result, e.g., the least significant b-bits.

Computing the decrypting univariate polynomial comprises obtaining a set of univariate polynomials by for each polynomial of the public set substituting the private encrypting value into the polynomial and reducing modulo the public individual reduction integer associated with said polynomial, and summing the set of univariate polynomials and reducing modulo the global reduction integer.

In an embodiment of the public key encryption device, the public global reduction integer is an odd number larger than $2^{(\alpha+2)b-1}$ and/or lower than $2^{(\alpha+2)b}$, wherein $\alpha$ represents the highest degree in one of the two variables of the polynomials in the public set, and b represents a key length, and for each public individual reduction integer, the public global reduction integer minus said public individual reduction integer is a multiple of 2 to the power of the key length ($q_i = N - \beta_i 2^b$, $1 \leq \beta_i < 2^b$) and is less than 2 to the power of twice the key length, and wherein computing the symmetric key further comprises reducing modulo 2 to the power of the key length. In an embodiment of the public key encryption device, the public global reduction integer is an odd number larger than $2^{(\alpha+2)b-1}$ and lower than $2^{(\alpha+2)b}$.

In an embodiment of the public key encryption device, generating the decryption information comprises computing key confirmation data from the symmetric key for verifying if a reconstructed key equals said symmetric key, the decryption information comprising the key confirmation data.

As aspect of the invention concerns a private key decryption device for decrypting an encrypted message using decryption information and a private key, the decryption information comprising a decrypting univariate polynomial, the private key comprising a private random value. The private key decryption device comprises a symmetric key obtainer and a decryption unit.

The symmetric key obtainer is configured for reconstructing a symmetric key by substituting the private random value in the decrypting univariate polynomial. Reconstructing the symmetric key may also comprise taking as key K b bits of the output, e.g., the least significant b-bits.

The decryption unit is configured for decrypting the encrypted message with said reconstructed symmetric key. The symmetric key is also referred to as 'K'.

In an embodiment of the private key decryption device, the decryption information has been obtained by a public key encryption device using a public key generated by a key generation device.

In an embodiment of the private key decryption device, the decrypting univariate polynomial is represented as a list of coefficients of the decrypting univariate polynomial in a canonical form.

In an embodiment of the private key decryption device, the private random value is an integer. The decrypting univariate polynomial is a univariate polynomial with integer coefficients reduced modulo a public global reduction integer. Reconstructing the symmetric key comprises substituting the private random value in the decrypting univariate polynomial and reducing modulo the public global reduction integer.

In an embodiment of the private key decryption device, the public global reduction integer is an odd number larger than $2^{(\alpha+2)b-1}$ and/or lower than $2^{(\alpha+2)b}$, wherein $\alpha$ represents the highest degree in one of the two variables of the polynomials in the public set, and b represents a key length. In an embodiment of the private key decryption device, the public global reduction integer is an odd number larger than $2^{(\alpha+2)b-1}$ and lower than $2^{(\alpha+2)b}$.

Computing the symmetric key further comprises reducing modulo 2 to the power of the key length.

In an embodiment of the private key decryption device, reconstructing the symmetric key comprises deriving a first reconstructed key from the result of substituting the private random value in the decrypting univariate polynomial and reducing modulo the public global reduction integer, and determining from the key confirmation data if the first reconstructed key equals the symmetric key and if not deriving a further reconstructed key from the first reconstructed key.

In an embodiment of the private key decryption device, deriving a further reconstructed key comprises adding the public global reduction integer or a multiple of the public global reduction integer to the first reconstructed key and reducing modulo the 2 to the power of the key length.

An embodiment of the encryption system uses polynomial rings. In particular:

In an embodiment of the key generation device, a public global reduction polynomial is associated with the public set and public individual reduction polynomials with each polynomial of the public set, the private random value is a polynomial, each particular polynomial in the public set is a bivariate polynomial with coefficients taken from the polynomial ring modulo the public individual reduction polynomial associated with the particular polynomial, and the public univariate polynomial and decrypting univariate polynomial have polynomial coefficients.

In an embodiment of the public key encryption device, a public global reduction polynomial is associated with the public set and public individual reduction polynomials with each polynomial of the public set, the encrypting random value is a polynomial, each particular polynomial in the public set is a bivariate polynomial with coefficients taken from the polynomial ring modulo the public individual reduction polynomial associated with the particular polynomial, and the public univariate polynomial and decrypting univariate polynomial have polynomial coefficients.

In an embodiment of the private key decryption device, the private random value is a polynomial, and the decrypting univariate polynomial has polynomial coefficients.

An aspect of the invention concerns a key generation method configured to generate a public key for use in a public key encryption method and a corresponding private key for use in a private key decryption method.

An aspect of the invention concerns a public key encryption method for encrypting an electronic message using a public key.

An aspect of the invention concerns a private key decryption method for decrypting an encrypted message using decryption information and a private key.

A method according to the invention may be implemented on a computer as a computer implemented method, or in dedicated hardware, or in a combination of both. Executable code for a method according to the invention may be stored on a computer program product. Examples of computer program products include memory devices, optical storage devices, integrated circuits, servers, online software, etc. Preferably, the computer program product comprises non-transitory program code means stored on a computer readable medium for performing a method according to the invention when said program product is executed on a computer.

In a preferred embodiment, the computer program comprises computer program code means adapted to perform all the steps of a method according to the invention when the computer program is run on a computer. Preferably, the computer program is embodied on a computer readable medium.

BRIEF DESCRIPTION OF THE DRAWINGS

These and other aspects of the invention are apparent from and will be elucidated with reference to the embodiments described hereinafter. In the drawings.

Figure 1:
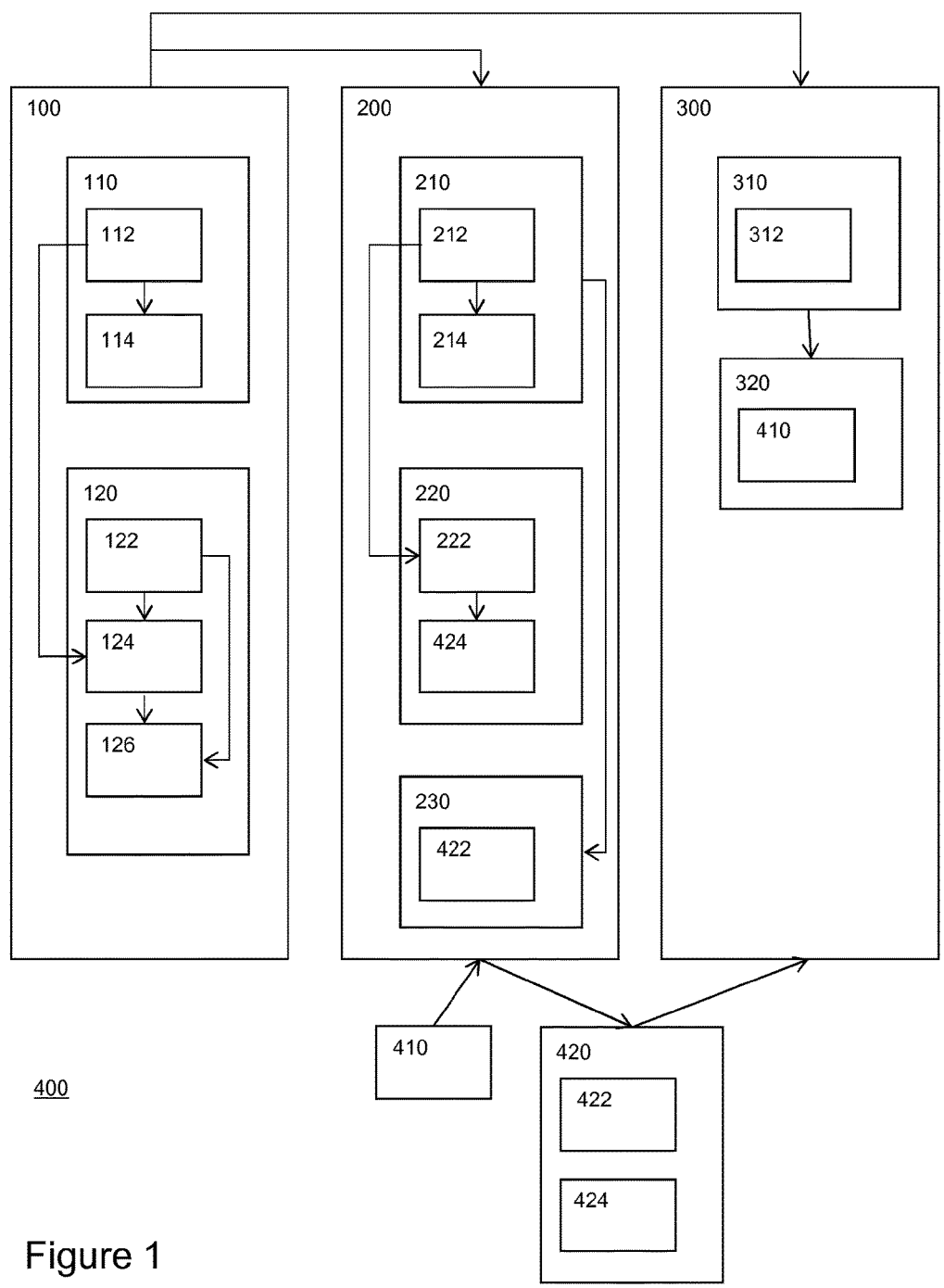
FIG. 1 is schematic block diagram of an encryption system 400.

It should be noted that items which have the same reference numbers in different Figures, have the same structural features and the same functions, or are the same signals. Where the function and/or structure of such an item has been explained, there is no necessity for repeated explanation thereof in the detailed description.

DETAILED EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

FIG. 1 is schematic block diagram of an encryption system 400. Encryption system 400 comprises a key generation device 100, a public key encryption device 200, and a private key decryption device 300. Public key encryption device 200 will also be referred to as encryption device 200. Private key decryption device 300 will also be referred to as decryption device 300.

Key generation device 100 is configured to generate a public key 126 for use in encryption device 200 and a corresponding private key 114 for use in decryption device 300. Using public key 126, encryption device 200 can encrypt a message 410, i.e., data intended for decryption device 300, to obtain encrypted message 422. In addition to encrypted message 422, encryption device 200 also produces decryption information 424. Using private key 114, encrypted message 422, and public univariate polynomial 124, decryption device 300 can decrypt decryption information 424 to again obtain message 410. This encryption and decryption system is a so-called asymmetric encryption, also known as public-private key encryption. In contrast with symmetric encryption, knowledge of the public key does not imply knowledge of the private key. This means that any device with access to the public key can encrypt a message, but only a device with access to the private key can decrypt a message. This in turn implies that one can apply different security policies to public and private data. For example, in some applications the public key is published so that it is not secret, whereas the private key is kept secret. For example, the private key may only be known to decryption device 300 and key generation device 100, or to one or more trusted parties.

The use of the adjectives public and private is intended as helpful for understanding: Even with access to all public data, the private data cannot be computed, at least not without unreasonable high resources given the security of the application or compared to the resources needed for key generation, encryption and decryption. However, 'public' does not mean that the corresponding data is necessarily made available to anybody else than key generation device 100 and encryption device 200. In particular, keeping the public key and other public data secret from untrusted parties increases security.

Figure 2:
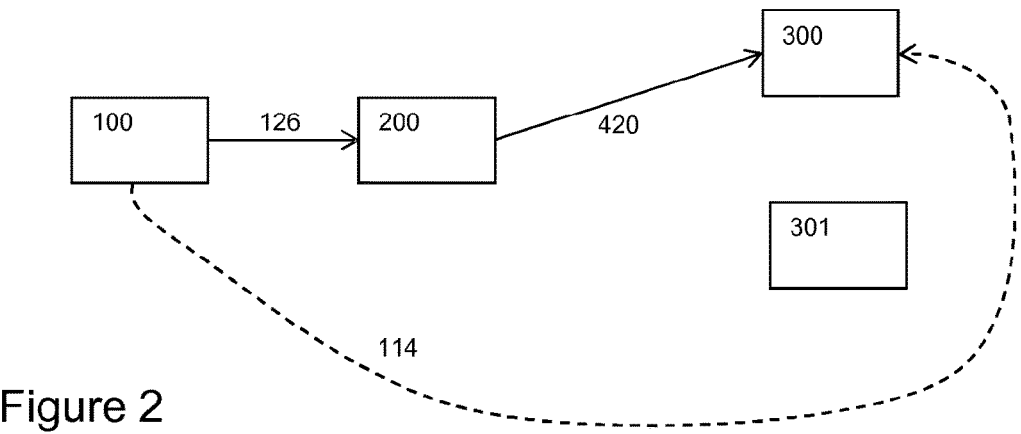
FIG. 2 is a schematic block diagram of an encryption system 430.

Key generation device 100, encryption device 200 and decryption device 300 may be the only three entities in encryption system 400. In FIG. 2, a configuration of encryption system 400 is shown in which there are multiple private key decryption devices. FIG. 2 shows private key decryption devices 300 and 301, there may be more. In FIG. 2, encryption device 200 receives public key 126 from key generation device 100; and decryption device 300 receives private key 114, and possibly other public data such as public univariate polynomial 124 and parameters such as a moduli. This is just an illustrative example though, as there are other ways of distributing keys in encryption systems as is also shown herein.

Continuing with FIG. 1; Key generation device 100 comprises a private key generator 110 and a public key generator 120.

Private key generator 110 is configured to obtain in electronic form a private random value 112, also referred to as s. Private random value 112 is random in the sense that its predictability for an attacker is less than a predetermined security bound. For example, private random value 112 may be selected by key generation device 100 using a random number generator comprised in key generation device 100 (not separately shown). The random number generator may be a true random number generator or a pseudorandom number generator. Private key generator 110 generates private key 114 using private random value 112. Private key 114 is electronic data comprising private random value 112. For example, private key 114 may be a data structure comprising private random value 112. Private key 114 may contain other data such as a validity date range for private key 114, the allowable uses of private key 114, and the like.

The asymmetric encryption scheme used by key generation device 100 imposes remarkably little requirements on private random value 112, compared to some other asymmetric cryptography. For example, RSA key generation requires its private key to comprise two prime numbers, which are resource intensive to compute.

Private random value 112 may be identity based. For example, key generation device 100 may comprise a secret key memory storing a secret key (not shown in FIG. 1). The secret key could be a public key of some asymmetric encryption scheme or a symmetric key. Private key generator 110 may be configured to obtain private random value 112 by obtaining, say, receiving or generating, an identity of decryption device 300, say an identity number, and encrypting the identity. Given an identity number, key generation device 100 can regenerate the private key of decryption device 300, by encryption the identity again. This system is, e.g., suited for situations in which access to the data on a device 300 may later be needed, say for product recalls, forensics and the like, even if the private key is lost or inaccessible at decryption device 300. If there are multiple private key decryption devices, e.g., as in FIG. 2, key generation device 100 can reconstruct the private keys of the multiple decryption devices without having to store a database of keys. The identity of device 300 may be included in the public key 126 and/or private key 114.

Public key generator 120 is configured to obtain in electronic form a public set of bivariate polynomials 122, also referred to as $f_i(,)$ in formulas. The embodiment described below assumes that all bivariate polynomials in set 122 are symmetric. Using symmetric polynomials brings a number of advantages. First of all they require fewer coefficients to specify, and thus use fewer resources. Second, they simplify bookkeeping; with a non-symmetric polynomial key generation and decryption uses a first of two variables of the polynomials for substitution, whereas encryption uses a second of two variables of the polynomials for substitution.

The symmetric bivariate polynomial may also be notated as $f_i(x, y)$ with two formal variables as placeholder. A symmetric bivariate polynomial satisfies $f_i(x, y)=f_i(y, x)$. This requirement translates to a requirement on the coefficients, e.g., that the coefficient of a monomial $x^a y^b$ equals the coefficient of a monomial $x^b y^a$.

Public set 122 may be obtained in a number of ways. For example, public set 122 may be prescribed, e.g., by a standard determining the encryption to be used in key generation device 100. In that case, public keys of different devices only differ because they were generated using a different private random value 112. Using a fixed public set 122 reduces communication and/or storage overhead at decryption device 300.

Using different public sets 122 for different decryption devices 300 increases security. For example, public set 122 may be generated randomly by computing random values for the coefficients of the polynomials in public set 122. It is convenient to prescribe some aspects of public set 122, such as the number of polynomials in public set 122 and the degrees of the polynomials, or the maximum degrees. It may also be prescribed that some of coefficients in the polynomials are zero, e.g., for reducing storage requirements.

The number of polynomials in public set 122 may be chosen differently depending on the application. Public set 122 comprises at least one symmetric bivariate polynomial. In an embodiment of key generation device 100 the set consists of one polynomial. Having only one polynomial in public set 122 reduces complexity, storage requirements and increases speed. However, having only one polynomial in public set 122 is considered less secure than having two or more polynomials in public set 122 because such a one-polynomial system does not profit from additional mixing in the summation described below. However, key generation, encryption and decryption will work correctly and are considered sufficiently secure for low-value and/or low-security applications.

In the remainder, we will assume that public set 122 comprises at least two symmetric bivariate polynomials. In an embodiment, at least two, or even all of the polynomials are different; this complicates analysis of the system considerably. It is not necessary though, public set 122 may comprise two equal polynomials and still benefit from mixing in the summation step if these two polynomials are evaluated over different rings; this point will be discussed further below. In an embodiment, public set 122 comprises at least two equal polynomials associated with different rings. Having two or more equal polynomials reduces storage requirements.

The polynomials in public set 122 may be of different degrees. With the degree of a symmetric bivariate polynomial we will mean the degree of the polynomial in one of the two variables. For example, the degree of $x^2y^2+2xy+1$ equals 2 because the degree in x is 2. Because the polynomials in public set 122 are symmetric the degree will be the same in the other variable.

The degrees of polynomials in public set 122 may be chosen differently depending on the application. Public set 122 comprises at least one symmetric bivariate polynomial of degree 1 or higher. In an embodiment, public set 122 comprises only polynomials of degree 1. Having only linear polynomials in public set 122 reduces complexity, storage requirements and increases speed. However, having only degree one polynomials in public set 122 is considered less secure than having the same number of polynomials with at least one polynomial of degree at least two in public set 122 because such a system is considerably less linear. In an embodiment, public set 122 comprises at least one, preferably two, polynomials of degree 2 or higher. However, key generation, encryption and decryption will work correctly if only degree 1 polynomials are used and with a small number of bivariate polynomials they are considered sufficiently secure for low-value and/or low-security applications. Note however, that if multiple polynomials in public set 122 evaluated over different rings that the resulting encryption is not linear even if the all polynomials in public set 122 are. As linear polynomials are efficiently evaluated, in an embodiment public set 122 comprises a large number of linear polynomials. An efficient solution is achieved that is still considered sufficiently secure for high-value security applications.

In a further embodiment, that can be used both with linear and non-linear polynomials, public set 122 comprises of a large number of bivariate polynomials comprising of a single monomial that are evaluated in different rings. This advantageously has a small public key size, and is efficiently evaluated, while providing sufficient security that scales with the number of polynomials.

Having one or more polynomials in public set 122 with degree 0 will not impact the system, so long as the polynomial(s) with higher degree provide sufficient security.

For a mid-security application, public set 122 may comprise, or even consist of, two symmetric bivariate polynomials of degree 2. For a higher security application, public set 122 may comprise or even consist of two symmetric bivariate polynomials, one of degree 2 and one of degree higher than 2, say 3. Increasing the number of polynomials and/or their degrees will further increase security at the cost of increased resource consumption.

Public key generator 120 is configured to compute a public univariate polynomial 124 by summing over univariate polynomials obtained by substituting private random value 112 into the polynomials of public set 122. For example, public key generator 120 may substitute private random value 112 into each one of the symmetric polynomials in public set 122 and reduce the result. By substituting a particular value, such as private value 112, into one of the two variables of a symmetric bivariate polynomial, but not substituting a particular value for the other variable, one of the variables is removed and a univariate polynomial is obtained.

After the substitutions in public set 122, bringing the results into a canonical form is advisable. For example, within key generation device 100 and encryption system 400 in general, a canonical form for univariate polynomials may be used. A good choice is to write the result of the substitution as a list of coefficients ordered by degree of the monomials, e.g., as an array. If values have multiple representations, a canonical choice is made for the coefficients as well.

One method for obtaining public univariate polynomial 124 is as follows.

1. for each polynomial in public set 122:
   a. substitute private random value 112 into the polynomial for one of the two variables
   b. bring the result into canonical form and reduce in a ring associated with the polynomial, thus obtaining a univariate polynomial
2. sum all the univariate polynomials obtained in 1b in a further ring to obtain public univariate polynomial 124

These steps may be combined to a large extent.

Also public univariate polynomial 124 may be represented as a list of coefficients according to a canonical form. A suitable form for many applications is to list the coefficients in an array ordered by the degree of the monomial associated with the coefficient. That is, a univariate polynomial may be regarded as a sum of monomials having a coefficient associated with the monomial. Again, examples including possible formulas are provided below.

Public key generator 120 is further configured to generate public key 126. Public key 126 comprises a representation of public univariate polynomial 124 and public set 122. For example, public key 126 may be an electronic data structure comprising a digital representation of public set 122 and public key 124. In addition, public key 126 may comprise additional information, similar to the private keys as noted above, e.g., an identity of a device that has access to the corresponding private key.

After key generation device 100 has generated private key 114 and public key 126, it may distribute private key 114 to decryption device 300, and public key 126 to a device 200 configured to encrypt a message for decryption device 300. The distribution may be done in various ways, some of which are discussed further below, or as shown in FIG. 2.

As an example, key generation device 100 may be employed in a manufacturing plant for manufacturing some kind of electronic units, say lighting unit, key generation device 100 may be configured to configure each manufactured unit, say lighting unit, with a (optional) different identifier, and a different private key. The electronic units are arranged with a decryption device 300.

For example, key generation device 100 may store the public keys corresponding to the private keys of the electronic units in a managing device that comprises encryption device 200. The managing device is configured to send technical data, say commands, encrypted with an appropriate public key. For example, the managing device may encrypt a command, say a 'turn on' command, for a unit with the public key that corresponds to the private key stored at the unit. The resulting encrypted message, e.g. encrypted command, may be addressed say with said identifier. Even if the managing device is compromised and an attacker gains access to all public keys stored therein, he does not obtain the corresponding private keys.

Another application for key generation device 100, which may, or may not, be combined with the preceding example, is to generate a public-private key pair and to configure each manufactured unit, say lighting unit, with the public key, and the managing device with the private key. The electronic units are arranged with an encryption device 200. Using their device 200, an electronic unit, such as a lighting unit, can send messages, such as status messages to the managing device in encrypted form. Many electronic devices may have access to the public key, and thus this key may leak, and become accessible to an attacker, in some way. However, because the data is public, it does not enable one to obtain the private key. The managing device is arranged with a decryption device 200.

The top of FIG. 1, schematically illustrates distribution of public key 126 to encryption device 200, and of public key 126 and private key 114 to decryption device 300 at the top of boxes 100, 200 and 300.

Encryption device 200 is configured to encrypt an electronic message 410 using a public key 126 that comprises a public univariate polynomial and a public set of symmetric bivariate polynomials. In particular, encryption device 200 is configured to use a public key 126 as generated by key generation device 100.

Encryption device 200 comprises a symmetric key obtainer 210, an encryption unit 230 and a decryption information generator 220.

Symmetric key obtainer 210 is configured to obtain in electronic form an encrypting random value 212. Encrypting random value 212 is also referred to as r. Encrypting random value 212 is random in the sense that its predictability for an attacker of the encrypted message is less than a security bound. A different encrypting random value 212 may be used for each message, but this is not necessary. Multiple messages may be encrypted using the same encrypting random value 212. Symmetric key obtainer 210 is configured to obtain a symmetric key 214 by substituting the encrypting random value 212 in public univariate polynomial 124 obtained from public key 126. Symmetric key 214 is also referred to as K. The substitution may be evaluated in a ring.

Encrypting random value 212 is secret, i.e., at least secret for parties not trusted with the contents of message 410. Decryption device 300 does not need encrypting random value 212. In an embodiment of encryption device 200, encrypting random value 212 is deleted after generating encrypted message 422 and decryption information 424, e.g., immediately thereafter.

Encrypted message 422 and decryption information 424 may be associated by combining them in message block 420. They may also be sent separately.

Even though a new encrypting random value 212 may be chosen for each message, private key 114 and public key 126 are likely the same over multiple messages. Depending on security requirements, at some point new keys may be distributed, say after more than a predetermined number of messages have been decrypted with private key 114. Decryption device 300 may refuse additional decryptions with the same private key 114 if said predetermined number of decryptions have been used up. This measure protects against, as of yet unknown, attacks, that attempt to attract information on private random value 112 by having decryption device 300 decrypt specially constructed message blocks 420. For this purpose decryption device 300 may comprise a counter for counting the number of messages decrypted with private key 114 and a blocking unit for blocking decrypting using private key 114 if the counter exceeds the predetermined number; For example, the blocking unit may be configured to delete private key 114 from decryption device 300.

Obtaining symmetric key 214 may involve other steps as well. For example, a hash function may be applied to symmetric key 214. This smooths the entropy in symmetric key 214 and may improve security, for example if the distribution of encrypting random value 212 is not uniform, or known to be uniform. Also, symmetric key 214 may be truncated to a key length. For example, one may take the b least significant bits of the result of the substitution and truncate.

Encryption unit 230 is configured to encrypt message 410 with symmetric key 214 to obtain encrypted message 422. Encryption unit 230 may be configured with any symmetric encryption algorithm. For example, encryption unit 230 may use a block cipher such as AES, CAST etc, using a suitable 'mode of operation' for encryption, such as CBC or CTR. If the message 410 is known to have a bit size less than or equal that of symmetric key 214 one may also add or XOR symmetric key 214 with message 410.

Decryption information generator 220 is configured to compute a decrypting univariate polynomial 222 by summing the univariate polynomials obtained by substituting encrypting random value 212 into the polynomials of public set 122. This step may use the same implementation as computing public univariate polynomial 124 apart from using encrypting random value 212 instead of private random value 112. Decryption information generator 220 is further configured to generate decryption information 424. The decryption information comprises the decrypting univariate polynomial 222. The decryption information may only comprise the decrypting univariate polynomial 222, but may also comprise additional information, such as sender information and/or an electronic signature.

Decryption information generator 220 may represent decrypting univariate polynomial as a list of coefficients of the decrypting univariate polynomial in a canonical form. The same type of canonical form used for public univariate polynomial 124 may be used for decrypting univariate polynomial 222. In particular, decrypting univariate polynomial 222 may be represented as a list of the coefficients of the monomials of decrypting univariate polynomial 222 sorted by degree of the polynomials. Decrypting univariate polynomial 222 or public univariate polynomial 124 may also be represented as a list of pairs, each pair comprising a coefficient of a monomials and a degree. In this representation, monomials with a zero coefficient need not be represented. The latter representation is also suited for sparse polynomials in public set 122.

In addition to encrypting, encryption unit 230 is also configured to associate encrypted message 422 with decryption information 424. This may be done in a number of ways. For example, encrypted message 422 and decryption information 424 may be associated together by embedding them into the same single message; e.g. by extending encrypted message 422 with decryption information 424. Encrypted message 422 and decryption information 424 need not necessarily be part of the same message. For example encrypted message 422 and decryption information 424 may each be combined with a header that contains the same identifier; through the same identifier the two messages are associated. Encryption device 200 may send decryption device 300 encrypted message 422 earlier than decryption information 424. In this way encryption device 200 commits to message 410 but does not yet allow decryption device 300 to read message 410. At a later point in time, encryption device 200 may send decryption information 424 to decryption device 300 to reveal its content. Committing to a message without yet revealing its contents is a basic cryptographic primitive, making the system applicable in a wide variety of cryptographic algorithms, such as electronic voting systems. Interestingly, the public key encryption system described herein, allows a party having access to an encryption device 200, to commit to a value, later reveal the value by sending the decryption information, yet without revealing the private key.

Encryption device 200 may receive message 410 as input and produce message block 420 as output, as indicated at the bottom of FIG. 1. These elements are also shown inside encryption device 200 and decryption device 300. Often, message 410 will be generated inside of encryption device 200, say as an automatically generated message, such as a status message.

Encryption device 200, say symmetric key obtainer 210, may be configured to compute key confirmation data from symmetric key 214 (K) for verifying if a reconstructed symmetric key 312 (K') reconstructed by decryption device 300 equals symmetric key 214. Key confirmation data can take various forms. For example, the key confirmation data may be a cryptographic hash, say sha-256, over symmetric key 214. To verify if reconstructed key 312 equals symmetric key 214, decryption device 300 may compute the hash over reconstructed symmetric key 312 and verify if the hashes are the same. Key confirmation data may also comprise an encryption over an input. To verify if reconstructed symmetric key 312 equals symmetric key 214, decryption device 300 may encrypt the input with reconstructed symmetric key 312 and verify if the encryptions are the same, or decrypt the current input and verify if it equals the input. The input may be part of the key confirmation data, for example the input may be a nonce or even random. The input may also be fixed, in the latter case the input need not be part of the key confirmation data. The key confirmation data may be included in decryption information 424.

Decryption device 300 is configured for decrypting encrypted message 422 using decryption information 424 and private key 114. Decryption device 300 may need part of public data, e.g., a global modulus, more information regarding this is provided below. For example, decryption device 300 may receive public key 126, but decryption device 300 does not need all parts of it. In particular, decryption device 300 does not need access to public set 122 for decrypting.

The decryption information 424 and private key 114 used by decryption device 300 may be as generated by encryption device 200 or key generation device 100, respectively. Decryption information 424 comprises decrypting univariate polynomial 222 and private key 114 comprises private random value 112.

Decryption device 300 comprises a symmetric key obtainer 310 and a decryption unit 320.

Symmetric key obtainer 310 is configured to obtain a reconstructed symmetric key 312. Reconstructed symmetric key 312 is a reconstruction based on decryption information 424 of the symmetric key 214 used to encrypt message 410. Decryption unit 320 is configured to decrypt the encrypted message with reconstructed symmetric key 312. Decryption unit 320 is configured to use a decryption algorithm that corresponds to the encryption algorithm used to encrypt message 410. For example, if message 410 is encrypted using AES, then decryption unit 320 will decrypt using AES. The encryption and decryption algorithm to use may be fixed. For example, encryption device 200 and decryption device 300 may be configured to always use AES. But the encryption/decryption algorithm to use may also be configurable. For example, decryption information 424 may comprise information indicating the encryption algorithm used to encrypt message 410. Decryption device 300 may be configured to select a decryption algorithm for decrypting encrypted message 422 in dependence on said indication.

Symmetric key obtainer 310 is configured to reconstruct reconstructed symmetric key 312 by substituting private random value 114 (s) in decrypting univariate polynomial 222. This step will likely produce the encryption key. Unfortunately, it is not guaranteed that symmetric key 214 will be directly obtained from substituting private key 114 in decrypting univariate polynomial 222. The likelihood of this depends on the number of polynomials in public set 122, their degrees and the underlying rings. The likelihood may be computed by substituting private key 114 in a general formula representing public set 122, and calculating the likelihood of carries that distort the reconstructed key 312 and symmetric key 214 being the same.

Depending on said likelihood and the application, the importance of key confirmation data differs. Some applications may accept that, by chance, decryption device 300 may not be able to decrypt some messages, because it failed to reconstruct the key correctly. If needed, decryption device 300 could request encryption device 200 to send the message again, but re-encrypted with a different encrypting random value 212.

However, it is also possible for decryption device 300 to construct multiple keys, and determine reconstructed symmetric key 312 from the multiple keys, by verifying the multiple keys using the key confirmation data. At most one key from the multiple keys can be correctly verified using the key confirmation data.

The number of constructed keys and the choices made for the system, in particular for public set 122 and the underlying ring, influence the probability of decryption device 300 failing to construct a key equal to symmetric key 214. We will show below, that the probability may be reduced to zero, if required.

Generating the multiple constructed keys is preferably done iteratively. For example, symmetric key obtainer 310 may be configured for a key search as follows:
1. deriving a first reconstructed key (K') from the result of substituting the private random value (s) in the decrypting univariate polynomial,
2. Determining from the key confirmation data if the first reconstructed key (K') equals symmetric key 214 (K).
3. If equal terminate the key search
4. Generate a further reconstructed key the first reconstructed key (K').
5. Goto step 2.

Implementation of this key search may be done using a variety of programming means, such as for-next loops, while loops, do-until, and the like. Step 3 may terminate in case of a time-out as well.

Key generation device 100 and decryption device 300 may be combined in a single device, this avoids private random value 112 ever leaving the confines of decryption device 300. Encryption device 200 and decryption device 300 may be combined, for example, in an encrypted back-up system. Key generation device 100, encryption device 200 and decryption device 300 may be different devices, possibly geographically distributed. Encryption device 200 and decryption device 300 may communicate with each other over a communications network. Key generation device 100 may use a communications network to distribute key information, but may also use out-of-bound means, say a wired connection in a trusted location, transportation using a portable memory device such as a USB stick, and the like.

Interestingly, the computation system underlying the computation of private key 114, public univariate polynomial 124, symmetric key 214, decrypting univariate polynomial 222 and reconstructed symmetric key 312 may be chosen in a number of ways. For example, the coefficients of the bivariate and univariate polynomials, and the values, including private random value 112, and encrypting random value 212, may be chosen from a so-called commutative ring. A commutative ring is a mathematical concept in which a set of values is combined with an addition and a multiplication.

In case public set 122 comprises multiple polynomials, it is was an insight of the inventor that both an improved mixing effect and one-way-ness is obtained by associating a different commutative ring with each polynomial of public set 122. Public key generator 120 and decryption information generator 220 are configured to substitute private random value 112 or encrypting random value 212 respectively into each of the polynomials of public set 122 and reducing each polynomial in the ring associated therewith. Preferably, each polynomial is also brought into canonical form.

In formula form this may be represented as $\Sigma_i[f_i(s,)]_{R_i}$ or $\Sigma_i[f_i(r,)]_{R_i}$ for private random value 112 or encrypting random value 212 respectively. In these formula's, a polynomial $f_i(,)$ is associated with ring $R_i$. The square bracket indicates a reduction to canonical form in the indicated ring. The summation itself may take place in a global ring $R_0$ (not shown in the formula). Also computing symmetric key 214 and reconstructed symmetric key 312 may be performed in the global ring; possibly followed by additional processing such as truncating to key length (b) (in bits). For each local ring associated with a polynomial of the public set 122, there may be a mapping function for mapping elements of the ring to the global ring prior to summation. In many embodiments, the mapping is the natural mapping: the bit-pattern used to represent a value in the local ring is mapped to the value of the global ring having the same bit-pattern; in other words no actual computation action needs be performed to do the mapping.

A ring used as one of the rings associated with the polynomials in the public sets 122, or as the global ring is implemented, say in system 400, as follows. Values of the ring are represented in digital form in electronic devices 100, 200 and 300, and the addition and multiplication operations on the values are implemented as a digital algorithm. The algorithms may be implemented in software or in hardware. Hardware representation of these operations is often used, possibly in combination with software. A ring may have a canonicalization algorithm for representing a value of the ring in a unique form.

There are many commutative rings that may be represented in digital form. Two important examples are polynomial rings and integer rings. Below we give a worked example based on integer rings, in which each $R_i$ is chosen as $\mathbb{Z}_{q_i}$, i.e., the commutative ring of integers modulo $q_i$, and $R_0$ as $\mathbb{Z}_N$, i.e., the commutative ring of integers modulo N. These rings allow digital representation of their values as digitally represented integers, e.g., as integers from 0 to $q_i-1$ or to N−1, respectively. Polynomials may be represented as an array of values represented in this form. An addition algorithm may be implemented as a hardware implementation of integer addition followed by a software implementation of reduction modulo the modulus. Multiplication may be implemented as a hardware implementation of integer multiplication followed by a software implementation of reduction modulo the modulus. Many commutative rings and digital representation are known in the art, per se. Application of such digital representations to obtain a public-private key encryption system in the manner described herein, is not.

In an embodiment of encryption system 400, a public global reduction integer (N) is associated with the public set and a public individual reduction integer ($q_i$) with each polynomial of the public set. The associated information may be included in public key 126 or may be fixed. In an embodiment, the public global reduction integer is fixed, and need not be included in the public key, but the public individual reduction integers ($q_i$) are not fixed and may be generated together with public set 122. These numbers may be chosen randomly, in dependence upon security requirements, likelihood of correct decryption and the like. Below possible choices for these numbers are given. At least two of the public individual reduction integers are different, preferably all public individual reduction integers are different.

Private key generator 110 is configured to generate private random value 112 as an integer between 0 and the global public global reduction integer (N). Symmetric key obtainer 210 is configured to generate encrypting random value 212 as an integer between 0 and the global public global reduction integer (N).

Private key generator 110 is configured to obtain the polynomials in public set 122 as a symmetric bivariate polynomial with integer coefficients ($f_i(,)$). It is not required that the polynomials in public set 122 have coefficients that are reduced modulo the associated public reduction integer, for example the coefficients could be larger or negative. However, it is convenient for implementations that the polynomials of public set 122 are in canonical form, say with coefficients between 0 and the associated public reduction integer ($q_i$) minus 1 (inclusive).

Public key generator 120 is configured to generate the public univariate polynomial as a univariate polynomial with integer coefficients. Decryption information generator 220 is configured to generate decrypting univariate polynomial as a univariate polynomials with integer coefficients.

For example, public key generator 120 may be configured to generate the public univariate polynomial by
1. obtaining a set of univariate polynomials by
2. for each polynomial of the public set
   a. substituting the private random integer (s) into said polynomial ($f_i(s)$,)) and reducing modulo the public individual reduction integer ($q_i$) associated with said polynomial, and
3. summing the set of univariate polynomials and reducing modulo the global reduction integer (N), Configuring decryption information generator 220 to generate the decrypting univariate polynomial may be done the same, except to use encrypting random value 212 instead of private random value 112.

Symmetric key obtainer 210 is configured to compute the symmetric key (K) by substituting the encrypting random value (r) in the public univariate polynomial and reducing modulo the global reduction integer (N), taking the least key length number (b) of bits of the result.

As an example, the public global reduction integer (N) may be chosen as an odd number larger than $2^{(\alpha+2)b-1}$ and/or lower than $2^{(\alpha+2)b}$, wherein $\alpha$ represents the highest degree in one of the two variables of the polynomials in the public set, and b represents a key length. For each public individual reduction integer ($q_i$), the public global reduction integer (N) minus said public individual reduction integer ($q_i$) is a multiple of 2 to the power of the key length ($q_i = N - \beta_i 2^b$, $1 \leq \beta_i < 2^b$) and is less than 2 to the power of twice the key length. This particular choice of parameters is a trade-off between adequate mixing and a high probability the de decryption device can reconstruct the key. Other choices are possible.

In this case, computing the symmetric key (K) further comprises reducing modulo 2 to the power of the key length ($2^b$), i.e., truncating to take only the final b bits of the substitution result.

Symmetric key obtainer 310 may be configured to reconstruct the symmetric key (K) by substituting the private random value (s) in the decrypting univariate polynomial and reducing modulo the public global reduction integer (N) and reducing modulo 2 to the power of the key length ($2^b$).

In this embodiment, it is possible that the key obtained from only the substitution step is not yet equal to symmetric key 214. Detecting whether or not the reconstructed key equals the key used for encryption may use key confirmation data. Key confirmation may also be implicit, e.g., message 410 may be in a particular form, which is not obtained when decrypting with a different key.

If the key confirmation data for the key K (e.g., H(K) is different from H(K') for a hash function H), the decryption device 300 may calculate may still obtain the correct key. To do so, decryption device 300 calculates, from K' the values $<K'+jN>_{2^b}$ for a range of j and the key confirmation values thereof (e.g. hash values). At most one of these key confirmation values equals to the key confirmation value, e.g. hash value H(K). If that index j is found decryption device 300 uses that value of j and calculates K as $<K'+jN>_{2^b}$, with angle brackets denoting a modulo operation. If such a j is not found, then decryption device 300 cannot decrypt the data. In the latter case, decryption device 300 has several options, e.g., generate an error message, request re-encryption with a different encrypting random value 212, etc. Interestingly, the private random value 112 is needed only to compute the initial K', the other computations use the public global reduction integer (N).

The following algorithm may be used. Symmetric key obtainer 310 may be configured for a key search as follows:
1. deriving a first reconstructed key (K') from the result of substituting the private random integer (s) in the decrypting univariate polynomial,
2. Determining from the key confirmation data if the first reconstructed key (K') equals symmetric key 214 (K).
3. If equal terminate the key search
4. Generate a further reconstructed key the first reconstructed key (K', by calculating $<K'+jN>_{2^b}$, for a new non-zero value of j.
5. Goto step 2.

Step 3 may also terminate in case of a time-out. For example, on some resource-constrained devices the amount of time that may be spend on key reconstruction is limited.

Typically, the devices 100, 200 and 300 each comprise a microprocessor (not shown) which executes appropriate software stored at the device, e.g. which software may have been downloaded and stored in a corresponding memory, e.g. RAM (not shown), of the device.

Below a mathematical description is given of an embodiment of the system. First security parameters are chosen: a bit-length b, a number of polynomials in the public set m, and a maximum degree in the public set $\alpha$. The bit-length b determines the key length in the symmetric encryption. Increasing the other two parameters, increases the complexity of the system. These three parameters may be fixed, e.g., determined by a system architect, or may be selected by key generation device 100. Furthermore, key generation device 100 chooses an odd number N in the interval ($2^{(\alpha+1)b}$, $2^{(\alpha+2)b}$), m integers $q_i$, $1 \leq i \leq m$ of the form $q_i = N - \beta_i 2^b$ with integer $\beta_i$ satisfying $1 \leq \beta_i < 2^b$ and m symmetric bivariate polynomials of degree $\alpha$:

$$f_i(x, y) = \sum_{j=0}^{\alpha} \sum_{k=0}^{\alpha} (f_i)_{jk} x^j y^k$$

with $$(f_i)_{jk} = (f_i)_{kj}$$

and $$0 \leq (f_i)_{jk} < q_i.$$

Because of symmetry, only those $(f_i)_{jk}$ with $j \leq k$ need to be specified. Key generation device 100 chooses a secret private integer s (112) in the range $1 \leq s < 2^b$ and calculates the public univariate polynomial 125 by calculating ($\alpha$+1) numbers $$a_k = \left\langle \sum_{i=1}^{m} \left\langle \sum_{j=0}^{\alpha} (f_i)_{jk} s^j \right\rangle_{q_i} \right\rangle_N$$

for $$0 \leq k \leq \alpha.$$

The public key generated by key generation device 100 comprises of all the above parameters, except for s. In this particular embodiment, key generation device 100 also specifies a hash function H. Encryption device 200 chooses a random integer r in the in the range $1 \le r < 2^b$ and calculates the decrypting univariate polynomial 222 by calculating $(\alpha+1)$ numbers $$b_k = \left\langle \sum_{i=1}^{m} \left\langle \sum_{j=0}^{\alpha} (f_i)_{jk} r^j \right\rangle_{q_i} \right\rangle_N$$

for $0 \le k \le \alpha,$ as well as the number $$K = \left\langle \left\langle \sum_{k=0}^{\alpha} a_k r^k \right\rangle_N \right\rangle_{2^b}$$

and a key confirmation data, such as the hash of K, H(K). Encryption device 200 transmits the $b_k$, as well as H(K) and the number $C = \langle M+K \rangle_{2^b}$, where M is the b-bit plaintext message which is to be sent from key generation device 100 to decryption device 300. Instead of adding K, encryption device 200 may also use other encryption algorithms to obtain C by encrypting M with K.

Decryption device 300 calculates $$K' = \left\langle \left\langle \sum_{k=0}^{\alpha} b_k s^k \right\rangle_N \right\rangle_{2^b},$$

and the hash values $$H_j = H(\langle K'+jN \rangle_{2^b}) \text{ for } -(3m+\alpha+1) \le j \le (3m+\alpha+1).$$

Decryption device 300 finds j' such that $H_{j'} = H(K)$ and retrieves K as $\langle K'+j'N \rangle_{2^b}$. Decryption device 300 now retrieves the transmitted message M as $M = \langle C-K \rangle_{2^b}$. Instead of subtracting K, decryption device 300 may also use other decryption algorithms corresponding to the encryption algorithms to obtain M by decryption of M with K.

The security of the scheme depends on the difficulty of finding s, given the coefficients $a_k$ and $(f_i)_{jk}$. For $m>1$ and $\alpha>1$ a way to do this is to try all possible values of s, which is unfeasible if b is large enough. A value of b=128 or more is so large that trying all possible values of s is unfeasible, i.e., brute force attacks are ruled out. However, some applications do not require absolute unfeasibility. In that case, values of b=48 or more may already be sufficient.

For m=1, the coefficients $a_k$ are polynomial in s in the ring $Z_{q_1}$. Such a system may possibly be attacked by adapting root finding algorithms. Although this certainly is not an easy task, for all security applications it is recommended to choose m>1.

For m>1 and $\alpha$>1, another approach to finding s is to map the scheme onto a so-called Closest Vector Problem in a certain lattice of dimension proportional to m and $\alpha$. For symmetric bivariate polynomials, this dimension has an upperbound of $(m+1)(\alpha+1)$, achieved when the bivariate polynomials have at least $(\alpha+1)(\alpha+2)/2$ different, non-zero coefficients and at least $(\alpha+1)(\alpha+1)$ non-zero coefficients, and a lower bound of m+1 if all bivariate polynomials are monomials in the same degree. All known algorithms for solving the Closest Vector Problem either take an amount of time that grows exponentially with the lattice dimension, or make an error that can grow exponentially with the lattice dimension. It has been found that the Closest Vector Problem in lattices of large dimension is unfeasible. Stehlé reported that most known analysis algorithms start failing when the dimension reaches 180. The inventors found that for very large dimensions—dimension 500 was found to satisfy this requirement—, existing analysis algorithms either do not work at all or are unfeasibly slow. As a further advantage, problems based on lattices such as the Closest Vector Problem are harder to analyse with upcoming quantum computers than existing cryptoalgorithms based on classical problems such as integer factorization.

In this embodiment, the size the public key producing key generation device 100, excluding the specification of b, m, $\alpha$ and the hash function, is $$\underbrace{(\alpha+2)b}_{N} + \underbrace{mb}_{\{\beta_i\}} + \underbrace{m(\alpha+1)(\alpha+2)b/2}_{\{(f_i)_{jk}\}} + \underbrace{(\alpha+1)(\alpha+2)b}_{\{a_k\}} =$$

$$((\alpha+2)^2 + m(\alpha^2+3\alpha+4)/2)b \text{ bits}.$$

Specification of b, m, $\alpha$ and the hash function may not be needed, e.g., if they are fixed in a system. Assuming the hash function H outputs f bits, the ciphertext encrypted message 422 for transmitting a b-bit message M is $$\underbrace{(\alpha+1)(\alpha+2)f}_{\{b_k\}} + \underbrace{f}_{H(K)} + \underbrace{f}_{C} = (\alpha^2+3\alpha+4)f \text{ bits}.$$

In the above embodiment, adding the K and M has been used as the encryption. This is a suitable choice, for example, if the system is applied to relatively short messages such as command messages. This construction may also be used to encrypt a second symmetric key, which in turn is used to encrypt M. The above construction may also be used with other symmetric encryption, say a block cipher, such as AES, say AES-128.

The above description may be varied in a number of ways. A number of possible variations are described below.

For example, the size of the decryption information 424 may be reduced considerably if we require that all polynomial coefficients $(f_i)_{jk}$ be zero, except when $j=k=\alpha$. This reduces the size of the public key, but more importantly, it implies that encryption device 200 only needs to transmit a single $b_k$, namely $b_\alpha$, so that the size of the ciphertext reduces to $(\alpha+4)b$ bits.

The problem of finding the secret key s when K is given now reduces to solving s from the single equation $$a_\alpha = \left\langle \sum_{i=1}^{m} \langle (f_i)_{\alpha\alpha} s^\alpha \rangle_{q_i} \right\rangle_N.$$

This is still a hard problem if m>1, $\alpha$>1.

Forming C as $\langle M+K \rangle_{2^b}$ is a good choice, since the nearly uniform distribution of K ensures that C is distributed (almost) uniformly even if the message M is not uniformly distributed. Other possible choices include $C = F_K(M)$ and $M = F_K^{-1}(C)$ for any 1-parameter set of invertible functions, for instance $F_K(M) = \langle AM+BK \rangle_{2^b}$ for given odd A, B.

$F_K(M) = K \cdot M$, where encryption device 200 must pick his random number r such that $K(s,r) \neq 0$.

$$F_K(M) = K + M.$$

Encryption system 400 and system 430 may be configured with alternative computation systems for performing multiplication and addition, also known as operations in 'rings'. It is considered that a commutative ring is preferable. Although rings are generally applicable, for readability, the example below is given for polynomial rings. Polynomial rings, like integer rings, are examples of commutative rings. The important difference with the system described above is that the coefficients of polynomials, the encrypting random value, and the private random value are elements from various polynomials rings. We will use 't' to indicate a formal variable of all the polynomial rings used.

As polynomial rings are known, per se, below only a brief overview is given. We consider the ring $Z_p[t]$, i.e., the ring of polynomials in a variable t with coefficients in $Z_p = Z/(pZ)$; $\{0, 1, \ldots, p-1\}$. An element of this ring is a polynomial $$A(t) = \sum_{k=0}^{\infty} a_k t^k = a_0 + a_1 t + a_2 t^2 + \ldots ,$$

wherein all $a_k \in Z_p$ and the series terminates: there is a K such that all coefficients $a_k = 0$ for k>K. The degree of A(t), denoted by deg(A(t)), is the value of K such that $a_K \neq 0$ and $a_k = 0$ for all k>K. This defines the degree of all elements of $Z_p[t]$, except for the zero polynomial. The degree of '0', i.e., the zero polynomial, is undefined.

Addition of two polynomials in $Z_p[t]$ may be defined as $$A(t) + B(t) = \sum_{k=0}^{\infty} a_k t^k + \sum_{k=0}^{\infty} b_k t^k = \sum_{k=0}^{\infty} \langle a_k + b_k \rangle_p t^k ,$$

wherein $\langle \cdot \rangle_p$ indicates that the argument is evaluated modulo p and lies in $Z_p$. Note that for non-zero polynomials A(t) and B(t) with $A(t)+B(t) \neq 0$, it holds that deg(A(t)+B(t)) ≤ max(deg(A(t)), deg(B(t))).

Multiplication of two polynomials in $Z_p[t]$ is defined as $$A(t) \cdot B(t) = \left( \sum_{k=0}^{\infty} a_k t^k \right) \cdot \left( \sum_{k=0}^{\infty} b_k t^k \right) = \sum_{k=0}^{\infty} \left\langle \sum_{m=0}^{k} a_m b_{k-m} \right\rangle_p t^k.$$

Note that if p is prime, it always holds for non-zero polynomials A(t) and B(t) that deg(A(t)·B(t))=deg(A(t))+deg(B(t)). If p is not prime, this is not necessarily true. We will assume p prime in the following.

Let Q(t) be a non-zero polynomial in $Z_p[t]$ (for prime p). Then any polynomial $A(t) \in Z_p[t]$ can be written uniquely as $A(t)=P(t) \cdot Q(t)+R(t)$, with deg(R(t))<deg(R(t)). Here P(t) is the result of division of A(t) by Q(t) and R(t) is the remainder. This remainder is denoted by $\langle A(t) \rangle_{Q(t)}$, or A(t) reduced modulo Q(t). The ring $R(Q(t), p) := Z_p[t]/(Q(t) Z_p[t])$, is defined as the set of the zero polynomial and of all polynomials in t with coefficients in $Z_p$ of degree less than deg(R(t)). Addition of two such polynomials is the same as addition in $Z_p[t]$, multiplication is the same as multiplication in $Z_p[t]$, followed by reduction modulo Q(t).

There is a natural mapping between non-negative integers and p-ary polynomials: the polynomial coefficients correspond to the digits in the p-ary expansion of the integer, so the integer corresponding to a polynomial can be obtained by substituting t=p in the polynomial and evaluating it in Z:

$$A(t) \leftrightarrow A = \sum_{k=0}^{deg(A(t))} a_k p^k.$$

Note that, this mapping does not imply equivalence of reduction modulo a polynomial Q(t) with integer reduction modulo Q. For instance, in $Z_2[t]$ it holds that $1+t^2=(1+t)(1+t)$, so $\langle 1+t^2 \rangle_{1+t}=0$, but $\langle 1+2^2 \rangle_{1+2} = \langle 5 \rangle_3 = 2 \neq 0$.

The set of elements of the ring R(Q(t), p) depends only on the degree of Q(t). Addition of these elements depends on p, as the polynomial coefficients are in $Z_p$, but is independent of Q(t). On the other hand, the result of their multiplication depends on p and Q(t).

Having a defined multiplication and addition in the ring R(Q(t),p) allows to define polynomials in this ring: their arguments are elements of this ring, they have ring-valued coefficients and take values in this ring. A bivariate polynomial $F(\bullet, \bullet)$ of degree α on R(Q(t),p) can thus be written as:

$$F(X(t), Y(t)) = \left\langle \sum_{j=0}^{\alpha} \sum_{k=0}^{\alpha} F_{jk}(t) (X(t))^j (Y(t))^k \right\rangle_{Q(t)} = \sum_{j=0}^{\alpha} \sum_{k=0}^{\alpha} \langle F_{jk}(t) (X(t))^j (Y(t))^k \rangle_{Q(t)},$$

where the summations (in $Z_p[t]$) can be taken outside of the modular reduction operation. We can even add (in $Z_p[t]$) polynomials in different rings $R(Q_1(t),p)$ and $R(Q_2(t),p)$, $R(Q_m(t),p)$:

$$\sum_{i=1}^{m} F_i(X(t), Y(t)) = \sum_{i=1}^{m} \sum_{j=0}^{\alpha} \sum_{k=0}^{\alpha} \langle F_{i,j,k}(t)(X(t))^j (Y(t))^k \rangle_{Q_i(t)}.$$

In all following embodiments we use p=2, which is easier to implement on bit-oriented devices. However, this is not limiting, as other values of p, are also possible, especially prime values. For instance 251 and 65521 are suitable choices as the coefficients fit in a byte and in two-bytes respectively.

Like in encryption system 400 and 430, the key generation device 100 comprises a private key generator 110 and a public key generator 120. The public key generator 120 is configured to select or otherwise obtain in electronic form the following parameters:

a public global reduction polynomial degree, denoted as M;

a key size (B bits)

an integer α, preferably α>1.

security parameter 'b' determining the size of the private random value and encrypting random value an integer m, preferably m≥2;

A good choice for the parameter M is M=2α(b−1)+B−1, and b=B. A system designer may select these parameters and send them to the key generation device. Furthermore the public key generator 120 is configured to select or otherwise obtain in electronic form the following parameters:

a public global reduction polynomial $N(t) \in Z_2[t]$. Its degree $\deg(N(t))$ equals M;

public individual reduction polynomials $Q_1(t), \ldots, Q_m(t)$ a public set of bivariate polynomials $F_i(,)$ of degree $\alpha$ in each of its two variables. In each $R(Q_i(t),2)$, a bivariate polynomial $F_i(\bullet,\bullet)$, with coefficients $F_{i,j,k}(t)=F_{i,k,j}(t)$, $1 \le i \le m$, $0 \le j, k \le \alpha$.

The key size (B) and the parameter size (b) can be different. It is an option to choose them equal.

With each polynomial in the public set a public individual reduction polynomial $Q_i(t)$ is associated and vice versa. Each particular polynomial $F_i(,)$ in the public set is a bivariate polynomial with coefficients $F_{i,j,k}(t)$ taken from the polynomial ring modulo the public individual reduction polynomial $Q_i(t)$ associated with the particular polynomial $F_i(,)$. The polynomial may be denoted as $F_i(x,y)=\Sigma_{k=0}^{j \le \alpha}\Sigma_{1=0}^{j \le \alpha} F_{i,j,k}(t)x^iy^j$.

A good way to select the public individual reduction polynomials $Q_i(t)$ is as follows: First select a polynomial $\gamma(t) \in Z_2[t]$ of degree B; then select m polynomials $\beta_1(t), \ldots, \beta_m(t) \in Z_2[t]$, all having a degree at most equal to $M-\alpha(b-1)-B$ and at least one (preferably all) having a degree larger than $M-2\alpha(b-1)-B$; then define m polynomials $Q_1(t), \ldots, Q_m(t)$, where $Q_i(t)=N(t)+\beta_i(t)\gamma(t)$. This choice for the reduction polynomials ensures that the symmetric key obtainer of the private key decryption device obtains the same symmetric key used by the public key encryption device directly from substituting the private random value in the decrypting univariate polynomial. Note that the lower limit for the degree of the public individual reduction polynomials may be taken as $-1$. Degree larger than $-1$ means that the degree should be at least 0. The degree must then be at most equal to alpha*(b-1)-1. In an embodiment, at least one, or even all, of the public individual reduction polynomials have degree at least 2.

The key generation device obtains in electronic form a private random value s in $\{0, 1, \ldots, 2^b-1\}$. And computes a public univariate polynomial by summing over univariate polynomials obtained by substituting the private random value (112, s) into the polynomials of the public set:

$$KM_{s,k}(t) = \sum_{i=1}^{m} \sum_{j=0}^{\alpha} \langle F_{i,j,k}(t)(s(t))^j \rangle_{Q_i(t)}, 0 \le k \le \alpha.$$

Note that the natural mapping between non-negative integers and p-ary (in this case binary) polynomials has been used to map s to s(t), that is, the coefficients of the binary expansion of s with the coefficients of s(t). The latter could also be generated directly.

As before, the public key encryption device comprises a symmetric key obtainer, decryption information generator and encryption unit.

The symmetric key obtainer is configured to obtain in electronic form an encrypting random value r in $\{0, 1, \ldots, 2^b-1\}$. The encrypting random value is substituted in the public univariate polynomial, $$\kappa(s, r, t) = \sum_{k=0}^{\alpha} \langle \langle KM_{s,k}(t)(r(t))^k \rangle_{N(t)} \rangle_{\gamma(t)}.$$

Here, the result is reduced module the global public global reduction polynomial and then modulo $\gamma(t)$. The result of this substitution and reductions is a polynomial in the formal variable (t). A symmetric key may be obtained from this in various ways. For example, the polynomial may be converted to a number using the natural mapping. The mapped result or the string of coefficients directly may be hashed. Key reduction, extension, entropy amplification and the like may be applied if needed. The encryption unit uses the symmetric key for encrypting a message as before.

The decryption information generator is configured for computing a decrypting univariate polynomial by summing over univariate polynomials obtained by substituting the encrypting random value (r) into the polynomials of the public set (122, $f_i(r,)$), and $$KM_{r,k}(t) = \sum_{i=1}^{m} \sum_{j=0}^{\alpha} \langle F_{i,j,k}(t)(r(t))^j \rangle_{Q_i(t)}, 0 \le k \le \alpha.$$

The private key decryption device comprises a symmetric key obtainer and a decryption unit.

The private key decryption device calculates the key $\kappa(r,s)$ from $$\kappa(r, s, t) = \sum_{k=0}^{\alpha} \langle \langle KM_{r,k}(t)(s(t))^k \rangle_{N(t)} \rangle_{\gamma(t)}.$$

Interestingly, the parameters guarantee that $\kappa(r,s)=\kappa(s,r)$. This key, possibly using the same derivation as the encryption device, may be used to decrypt the cipher text. In this case it is not needed to derive further reconstructed keys.

The bivariate polynomials $F_i(\bullet,\bullet)$ may be chosen as symmetric bivariate polynomials. This is not needed since the keying material that Alice publishes is $KM_{s,k}^{(1)}$, the keying material that Bob sends to Alice is $KM_{r,j}^{(2)}$. Both Alice and Bob calculate the same key $$\kappa(s, r, t) = \sum_{k=0}^{\alpha} \langle \langle KM_{s,k}^{(1)}(t)(r(t))^k \rangle_{N(t)} \rangle_{\gamma(t)} = \sum_{j=0}^{\alpha} \langle \langle KM_{s,j}^{(2)}(t)(s(t))^k \rangle_{N(t)} \rangle_{\gamma(t)}.$$

Figure 3:
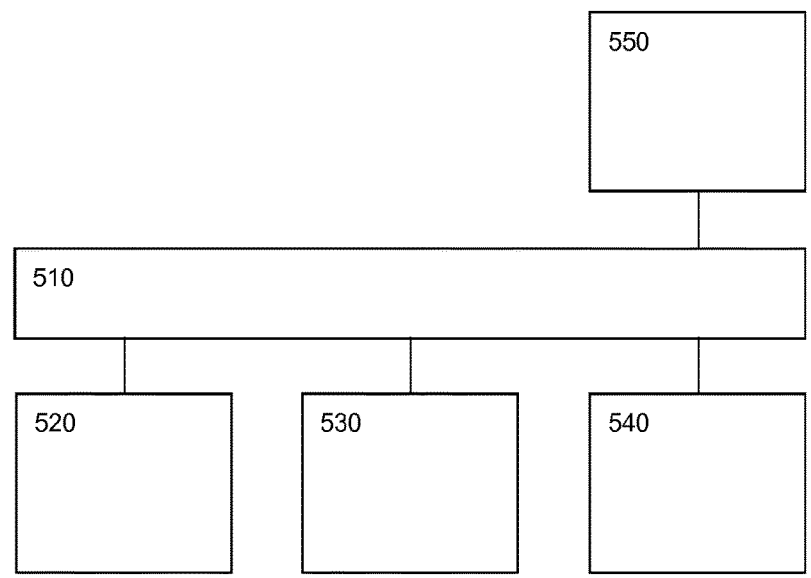
FIG. 3 is schematic block diagram of an integrated circuit 500.

FIG. 3 is schematic block diagram of an integrated circuit 500. Integrated circuit 500 comprises a processor 520, a memory 530, and an I/O unit 540. These units of integrated circuit 500 can communicate amongst each other through an interconnect 510, such as a bus. Processor 520 is configured to execute software stored in memory 530 to execute a method as described herein. In this way integrated circuit 500 may be configured as a key generation device 100, an encryption device 200 and/or a decryption device 300; Part of memory 530 may then store a public key, a private key, a plain message and/or encrypted message as required.

I/O unit 540 may be used to communicate with other devices such as devices 100, 200 or 300, for example to receive a public or private key, or to send and receive encrypted messages. I/O unit 540 may comprise an antenna for wireless communication. I/O unit 540 may comprise an electric interface for wired communication.

Integrated circuit 500 may be integrated in a computer, mobile communication device, such as a mobile phone, etc. Integrated circuit 500 may also be integrated in lighting device, e.g., arranged with an LED device. For example, an integrated circuit 500 configured as a decryption device 300 and arranged with lighting unit such as an LED, may receive commands encrypted with a public key. Only decryption device 300 can decrypt and execute the commands. For example, an integrated circuit 500 configured as an encryption device 200 and arranged with a lighting unit such as an LED, may send messages, such as status messages encrypted with a public key. Only a decryption device 300 with access to the private key corresponding to the public key can decrypt and execute the commands.

Although polynomial manipulation may be performed by processor 520 as instructed by polynomial manipulation software stored in memory 530, the tasks of key generation, encryption and decryption are faster if integrated circuit 500 is configured with optional polynomial manipulation device 550. Polynomial manipulation device 550 is a hardware unit for executing substitution and reduction operations.

Figure 4:
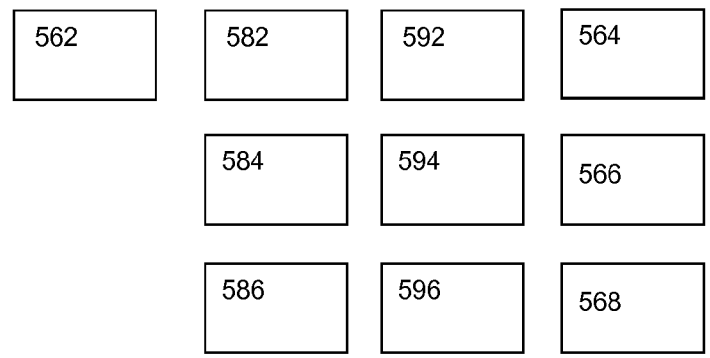
FIG. 4 is a schematic block diagram of a memory layout.

FIG. 4 is a schematic block diagram of a memory layout that may be used with memory 530, in case integrated circuit 500 is configured as key generation device 100. Shown in FIG. 4 are: a private random integer 562, such as s; a public global reduction integer 564, such as N; symmetric bivariate polynomials with integer coefficients 582-586, such as $f_i$, and associated public reduction integers 592-596, such as $q_i$. Furthermore, in FIG. 4 two parts of the memory are reserved as working space to compute the public key. Reduction result 566, is used to substitute private random integer 562 into one of the symmetric bivariate polynomials, and reduce modulo the public reduction integer. For each of the symmetric polynomials the result is then added to a summation result 566 and reduced modulo global integer 564. The layout shown in FIG. 4 is suitable for a system with m=3.

FIG. 4 has been explained for integer rings, however one may also allow the coefficients to be taken from polynomial rings. The required memory should be adapted correspondingly.

Figure 5:
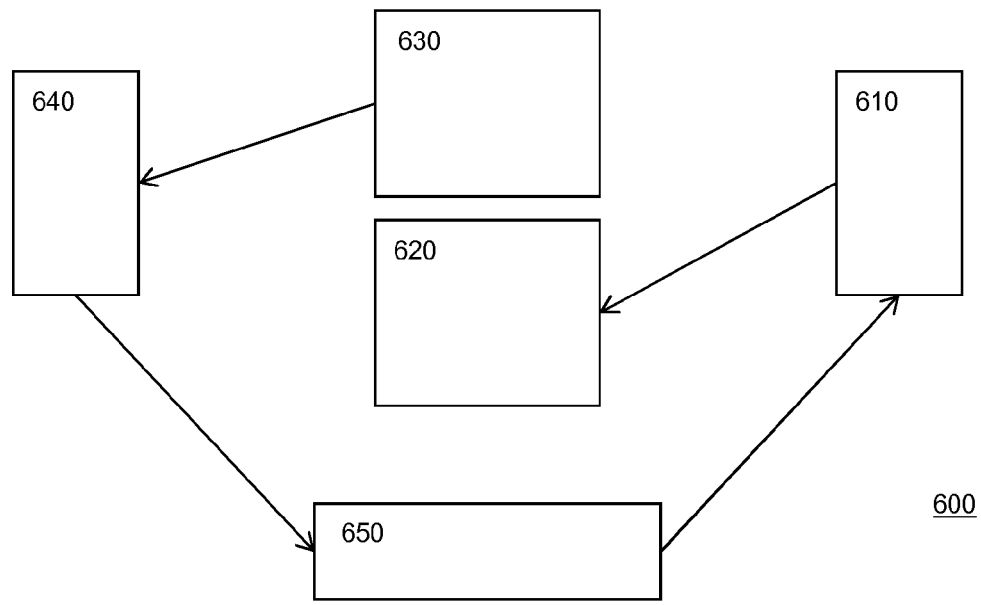
FIG. 5 is a schematic block diagram of an encryption system 600.

FIG. 5 is a schematic block diagram of an encryption system 600. FIG. 6 shows a receiving unit 610, configured with a key generation device 100 and decryption device 300; a sending unit 640 configured with an encryption device 200; a certificate authority 620 and a public key database 630. Furthermore, FIG. 6 shows encrypted data 650 sent from sending unit 640 to receiving unit 610. Receiving unit 610 and sending unit 640 are part of a network. Any device in the network can encrypt a message using the public key of the intended recipient. The intended recipient is in possession of the private key to decrypt the message.

A two-party communication between sending unit 640 and receiving unit 610 may work as follows:
(1) Receiving unit 610 chooses a public-private key pair (e,d) using his key generation device 100 as described herein. Here e represents the public key, and d the corresponding private key.
(2) receiving unit 610 then sends the encryption key e to sending unit 640 but keeps the decryption key d secret;
(3) sending unit 640 can send a message in (the 'plaintext') to receiving unit 610 by computing $c=E_e(m)$ (the 'ciphertext'); and
(4) when receiving unit 610 receives c, it can recover the original message by computing $m=D_d(c)$.

A more advanced embodiment of network encryption system 600 uses public key database 630 and certificate authority 620.

Receiving unit 610 sends his public key e to a certificate authority 630 (CA). Public key database 630 may verify the identity of a user of receiving unit 610, though this is not strictly necessary. Certificate authority 620 signs the public key using a public key of certificate authority 620. Certificate authority 620 publishes the signed public key, possibly together with the said identity, in public key database 630. When sending unit 640 wants to send a message to receiving unit 610, e.g., as identified with the identity, sending unit 640 looks up the public key in public key database 630, possibly using the identity as a search index. Sending unit 640 may verify the signature of certificate authority 620.

Having the polynomials in the public set symmetric simplifies implementation. In an embodiment of public key encryption system 100, at least one of the bivariate polynomials in public set 122 is asymmetric. In an embodiment, all polynomials in public set 122 are asymmetric.

The key generation works as described above, except that the key generation device is configured to substitute the private random value 112 into a particular one of the two variables of the polynomials of set 122. For example, if f(x,y) is one of the bivariate polynomials in set 122, and if the key generation device is configured to use the first of the two variables, it computes f(s,y). Summation steps (if any) are as described above. The encryption device, receives a public univariate polynomial 124. Since the univariate polynomial has only one variable, there is no difference in substitution the encrypting random value 212 therein. However, to compute the decrypting univariate polynomial 222, the encrypting device is configured to substitute the encrypting random value 212 into a second one of the two variables, i.e., a different one then used by the key generation device. Following the example above, the encryption device would compute f(x,r). Finally, the decryption device receives a univariate polynomial, so there is only one variable available for substitution.

Using asymmetric polynomials may increase security, as it ensures that the public univariate polynomial 124 and the decrypting univariate polynomial 222 have a different structure.

All embodiments given herein using symmetric polynomials in set 122 may be modified to use asymmetric polynomials. The only change needed is to make sure that the decrypting univariate polynomial 222 is obtained from substituting into one of the two variables of the polynomials in set 122, whereas the public univariate polynomial 124 is obtained from substituting into the other of the two variables of the polynomials in set 122.

Figure 6A:
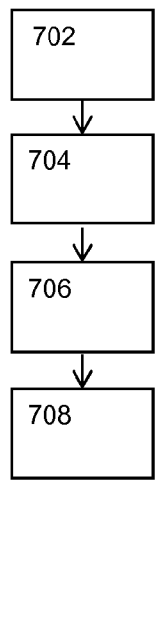
FIG. 6a is a schematic flow chart of a key generation method 700.

FIG. 6a is a schematic flow chart of a key generation method 700. Method 700 comprises generating 702 a private key, the private key comprising a private random value, obtaining 704 in electronic form a public set of symmetric bivariate polynomials ($f_i(,)$), computing 706 a public univariate polynomial by summing over univariate polynomials obtained by substituting the private random value (s) into the polynomials of the public set ($f_i(s,)$), and generating 708 the public key, the public key comprising the public univariate polynomial and the public set.

Figure 6B:
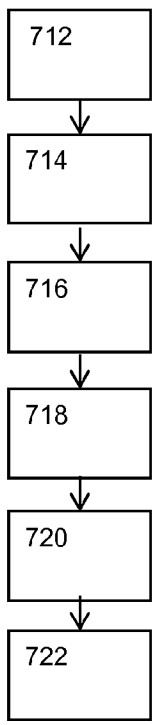
FIG. 6b is a schematic flow chart of an encryption method 710.

FIG. 6b is a schematic flow chart of an encryption method 710. Method 710 comprises obtaining 712 in electronic form an encrypting random value (r), computing 714 a symmetric key (K) by substituting the encrypting random value (r) in the public univariate polynomial, computing 716 a decrypting univariate polynomial by summing over univariate polynomials obtained by substituting the encrypting random value (r) into the polynomials of the public set ($f_i(r,)$), computing 718 key confirmation data from the symmetric key (K) for verifying if a reconstructed key (K') equals said symmetric key (K), generating 720 the decryption information, the decryption information comprising the decrypting univariate polynomial, and encrypting 722 the message with the symmetric key and associating said encrypted message with the decryption information.

Figure 6C:
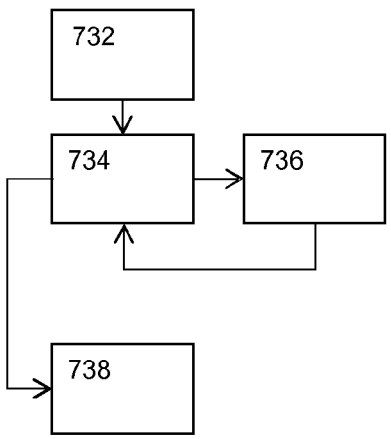
FIG. 6c is a flow chart of a decryption method 730.

FIG. 6c is a flow chart of a decryption method 730. Method 730 comprises reconstructing 732 a first symmetric key (K) by substituting the private random value (s) in the decrypting univariate polynomial, determining 734 from the key confirmation data if the reconstructed key (K') equals the symmetric key (K) and if not deriving 736 a further reconstructed key from the first reconstructed key (K'), e.g., by adding the public global reduction integer (N) or a multiple of the public global reduction integer (N) to the first reconstructed key (K') and reducing modulo the 2 to the power of the key length ($2^b$). If it is determined in 734 from the key confirmation data that the first reconstructed key (K') equals the symmetric key (K) then decrypting 738 the message with the symmetric key (K).

Many different ways of executing the method are possible, as will be apparent to a person skilled in the art. For example, the order of the steps can be varied or some steps may be executed in parallel. Moreover, in between steps other method steps may be inserted. The inserted steps may represent refinements of the method such as described herein, or may be unrelated to the method.

A method according to the invention may be executed using software, which comprises instructions for causing a processor system to perform method 700, 710 and 730. Software may only include those steps taken by a particular sub-entity of the system. The software may be stored in a suitable storage medium, such as a hard disk, a floppy, a memory etc. The software may be sent as a signal along a wire, or wireless, or using a data network, e.g., the Internet. The software may be made available for download and/or for remote usage on a server.

It will be appreciated that the invention also extends to computer programs, particularly computer programs on or in a carrier, adapted for putting the invention into practice. The program may be in the form of source code, object code, a code intermediate source and object code such as partially compiled form, or in any other form suitable for use in the implementation of the method according to the invention. An embodiment relating to a computer program product comprises computer executable instructions corresponding to each of the processing steps of at least one of the methods set forth. These instructions may be subdivided into sub-routines and/or be stored in one or more files that may be linked statically or dynamically. Another embodiment relating to a computer program product comprises computer executable instructions corresponding to each of the means of at least one of the systems and/or products set forth.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

Preferred embodiments can be summarized as follows.

Embodiment 1

A key generation device (100) configured to generate a public key (126) for use in a public key encryption device and a corresponding private key (114) for use in a private key decryption device, the key generation device comprising
  a private key generator (110) configured for
    obtaining in electronic form a private random value (112, s), and
    generating the private key (114), the private key comprising the private random value (112), and
  a public key generator (120) configured for
    obtaining in electronic form a public set of bivariate polynomials (122, $f_i$(,)) wherein a different commutative ring is associated with each polynomial of the public set of bivariate polynomials,
    computing a public univariate polynomial (124) by summing the univariate polynomials obtained by substituting the private random value (112, s) into the polynomials of the public set (122, $f_i$(s,)) the univariate polynomial obtained by substituting the private random value (s) into a particular polynomial of the public set ($f_i$(s,)) is reduced to a canonical form in the commutative ring associated with the particular univariate polynomial, and
    generating the public key (126), the public key comprising the public univariate polynomial (124) and the public set (122).

Embodiment 2

A public key encryption device (200) for encrypting an electronic message (410) using a public key, the public key comprising a public univariate polynomial and a public set of bivariate polynomials ($f_i$(,)), wherein a different commutative ring is associated with each polynomial of the public set of bivariate polynomials, the public key encryption device comprising
  a symmetric key obtainer (210) configured for
    obtaining in electronic form an encrypting random value (212, r), and
    computing a symmetric key (214, K) by substituting the encrypting random value (212, r) in the public univariate polynomial,
  a decryption information generator (220) configured for
    computing a decrypting univariate polynomial (222) by summing over univariate polynomials obtained by substituting the encrypting random value (r) into the polynomials of the public set (122, $f_i$(r,)), the univariate polynomial obtained by substituting the encrypting random value (r) into a particular polynomials of the public set ($f_i$(r,)) is reduced to a canonical form in the commutative ring associated with the particular univariate polynomial, and
    generating the decryption information (424), the decryption information comprising the decrypting univariate polynomial (222), and
  an encryption unit (230) configured for
    encrypting the message (410) with the symmetric key (214) and associating said encrypted message (422) with the decryption information (424).

Embodiment 3

A private key decryption device (300) for decrypting an encrypted message (422) using decryption information (424) obtainable by the public key encryption device of Embodiment 2, and a private key (114), the decryption information comprising a decrypting univariate polynomial (222), the private key comprising a private random value (112, s), the private key decryption device comprising
a symmetric key obtainer (310) configured for
reconstructing a symmetric key (312, K') by substituting the private random value (s) in the decrypting univariate polynomial (222),
a decryption unit (320) configured for
decrypting the encrypted message with said reconstructed symmetric key (312, K').

Embodiment 4

A public key encryption device as in Embodiment 2, wherein the public set of bivariate polynomials ($f_i(,)$) only comprises symmetric bivariate polynomials, and/or
the public set of bivariate polynomials ($f_i(,)$) comprises at least two different bivariate polynomials, and/or
at least one polynomial of the public set has a degree of at least two in one of the two variables of said at least one polynomial.

Embodiment 5

A public key encryption device as in Embodiment 2, wherein the public univariate polynomial is represented as a list of coefficients of the public univariate polynomial in a canonical form, and the decrypting univariate polynomial is represented as a list of coefficients of the decrypting univariate polynomial in a canonical form.

Embodiment 6

A public key encryption device as in Embodiment 2, wherein a public global reduction integer (N) is associated with the public set and a public individual reduction integer ($q_i$) with each polynomial of the public set, the private random value and the encrypting random value (r) are integers, each polynomial in the public set is a bivariate polynomial with integer coefficients ($f_i(,)$), the public univariate polynomial and decrypting univariate polynomial are univariate polynomials with integer coefficients, and wherein
computing the symmetric key (K) comprises substituting the encrypting random value (r) in the public univariate polynomial and reducing modulo the global reduction integer (N),
computing the decrypting univariate polynomial comprises
obtaining a set of univariate polynomials by
for each polynomial of the public set substituting the private encrypting value (r) into the polynomial ($f_i(r,)$) and reducing modulo the public individual reduction integer ($q_i$) associated with said polynomial, and
summing the set of univariate polynomials and reducing modulo the global reduction integer (N).

Embodiment 7

A public key encryption device as in Embodiment 6, wherein the public global reduction integer (N) is an odd number larger than $2^{(\alpha+2)b-1}$ and/or lower than $2^{(\alpha+2)b}$, wherein $\alpha$ represents the highest degree in one of the two variables of the polynomials in the public set, and b represents a key length, and for each public individual reduction integer ($q_i$), the public global reduction integer (N) minus said public individual reduction integer ($q_i$) is a multiple of 2 to the power of the key length ($q_i = N - \beta_i 2^b$, $1 \leq \beta_i < 2^b$) and is less than 2 to the power of twice the key length, and wherein computing the symmetric key (K) further comprises reducing modulo 2 to the power of the key length ($2^b$).

Embodiment 8

A private key decryption device as in Embodiment 3, wherein the decryption information comprises key confirmation data computed from the symmetric key (K) for verifying if a reconstructed key (K') equals said symmetric key (K), the decryption information comprising the key confirmation data, and wherein reconstructing the symmetric key (K) comprises
deriving a first reconstructed key (K') from the result of substituting the private random value (s) in the decrypting univariate polynomial and reducing modulo the public global reduction integer (N),
determining from the key confirmation data if the first reconstructed key (K') equals the symmetric key (K) and if not deriving a further reconstructed key from the first reconstructed key (K').

Embodiment 9

A private key decryption device as in Embodiment 8, wherein reconstructing the symmetric key (K) comprises substituting the private random value (s) in the decrypting univariate polynomial and reducing modulo the public global reduction integer (N), wherein deriving a further reconstructed key comprises adding the public global reduction integer (N) or a multiple of the public global reduction integer (N) to the first reconstructed key (K') and reducing modulo the 2 to the power of the key length ($2^b$).

Embodiment 10

A public key encryption device as in Embodiment 2, wherein a public global reduction polynomial (N (t)) is associated with the public set and public individual reduction polynomials ($Q_i(t)$) with each polynomial of the public set, the private random value (s (t)) and the encrypting random value (r (t)) are polynomials, each particular polynomial ($F_i(,)$) in the public set is a bivariate polynomial with coefficients ($F_{i,j,k}(t)$) taken from the polynomial ring modulo the public individual reduction polynomial ($Q_i(t)$) associated with the particular polynomial ($F_i(,)$), the public univariate polynomial and decrypting univariate polynomial have polynomial coefficients, and wherein
computing the symmetric key (K) comprises substituting the encrypting random value (r(t)) in the public univariate polynomial and reducing modulo the global reduction polynomial (N(t)),
computing the decrypting univariate polynomial comprises obtaining a set of univariate polynomials by
for each polynomial of the public set substituting the private encrypting value (r(t)) into the polynomial ($F_i$,r)) and reducing modulo the public individual reduction polynomial ($Q_i$(t)) associated with said polynomial, and
summing the set of univariate polynomials.

Embodiment 11

A key generation method configured to generate a public key for use in a public key encryption method and a corresponding private key for use in a private key decryption method, the key generation method comprising
obtaining in electronic form a private random value (s), wherein a different commutative ring is associated with each polynomial of the public set of bivariate polynomials, and
generating the private key, the private key comprising the private random value, and
obtaining in electronic form a public set of bivariate polynomials ($f_i$(,)),
computing a public univariate polynomial by summing over univariate polynomials obtained by substituting the private random value (s) into the polynomials of the public set ($f_i$(s,)), the univariate polynomial obtained by substituting the private random value (s) into a particular polynomial of the public set ($f_i$(s,)) is reduced to a canonical form in the commutative ring associated with the particular univariate polynomial, and
generating the public key, the public key comprising the public univariate polynomial and the public set.

Embodiment 12

A public key encryption method for encrypting an electronic message using a public key, the public key comprising a public univariate polynomial and a public set of bivariate polynomials ($f_i$(,)), wherein a different commutative ring is associated with each polynomial of the public set of bivariate polynomials,
obtaining in electronic form an encrypting random value (r), and
computing a symmetric key (K) by substituting the encrypting random value (r) in the public univariate polynomial,
computing a decrypting univariate polynomial by summing over univariate polynomials obtained by substituting the encrypting random value (r) into the polynomials of the public set ($f_i$(r,)), the univariate polynomial obtained by substituting the encrypting random value (r) into a particular polynomials of the public set ($f_i$(r,)) is reduced to a canonical form in the commutative ring associated with the particular univariate polynomial, and
generating the decryption information, the decryption information comprising the decrypting univariate polynomial, and
encrypting the message with the symmetric key and associating said encrypted message with the decryption information.

Embodiment 13

A private key decryption method for decrypting an encrypted message using decryption information obtainable by the method of Embodiment 12, and a private key, the decryption information comprising a decrypting univariate polynomial, the private key comprising a private random value (s),
reconstructing a symmetric key (K) by substituting the private random value (s) in the decrypting univariate polynomial,
decrypting the message with the symmetric key (K).

Embodiment 14

A computer program comprising computer program code means adapted to perform all the steps of any one of the Embodiments 11, 12, and 13 when the computer program is run on a computer.

Embodiment 15

A computer program as claimed in Embodiment 14 embodied on a computer readable medium.

LIST OF REFERENCE NUMERALS IN FIGS. 1-5

100 a key generation device
110 a private key generator
112 a private random value
114 a private key
120 a public key generator
122 a public set of bivariate polynomials
124 a public univariate polynomial
126 a public key
200 a public key encryption device
210 a symmetric key obtainer
212 an encrypting random value
214 a symmetric key
220 a decryption information generator
222 a decrypting univariate polynomial
230 an encryption unit
300, 301 a private key decryption device
310 a symmetric key obtainer
312 a reconstructed symmetric key
320 a decryption unit
400 an encryption system
410 an electronic message
420 a message block
422 an encrypted message
424 a decryption information
430 an encryption system
500 an integrated circuit
510 a bus
520 a processor
530 a memory
540 an I/O unit
550 a polynomial manipulation device
562 a private random integer
564 a public global reduction integer
566 a reduction result
568 a summation result
582-586 a symmetric bivariate polynomial with integer coefficients
592-596 a public reduction integer
600 an encryption system
610 a receiving unit
620 a certificate authority
630 a public key database
640 a sending unit
650 encrypted data

The invention claimed is:

1. A public key encryption device for encrypting an electronic message using a public key, the public key comprising a public univariate polynomial and a public set of bivariate polynomials, wherein a different commutative ring is associated with each polynomial of the public set of bivariate polynomials, the public key encryption device comprising a symmetric key obtainer configured for
obtaining in electronic form an encrypting random value, and
computing a symmetric key by substituting the encrypting random value in the public univariate polynomial;

a decryption information generator configured for
computing a decrypting univariate polynomial by summing over univariate polynomials obtained by substituting the encrypting random value into the bivariate polynomials of the public set of bivariate polynomials, the univariate polynomial obtained by substituting the encrypting random value into a particular polynomials of the public set is reduced to a canonical form in the commutative ring associated with the particular univariate polynomial, and
generating the decryption information, the decryption information comprising the decrypting univariate polynomial; and an encryption unit configured for
encrypting the message with the symmetric key and associating said encrypted message with the decryption information, wherein the public key encryption device further comprises:
a private key decryption device for decrypting an encrypted message using decryption information obtainable by the public key encryption device, and a private key,
the decryption information comprising a decrypting univariate polynomial, the private key comprising a private random value, the private key decryption device comprising
a further symmetric key obtainer configured for
reconstructing a symmetric key by substituting the private random value in the decrypting univariate polynomial; and
a decryption unit configured for decrypting the encrypted message with said reconstructed symmetric key, and wherein the symmetric key obtainer in both the public key encryption device and the private key decryption device, the decryption information generator, the encryption unit and the decryption unit are executed by a microprocessor within the public key encryption device and the private key decryption device, and the public key encryption device and the private key decryption device are resource-constrained device such as a sensor, a lighting device, a LED lamp, a smart card, or an RFID tag within a lighting network.

2. The public key encryption device as claimed in claim 1, wherein
the public set of bivariate polynomials only comprises symmetric bivariate polynomials, and/or
the public set of bivariate polynomials comprises at least two different bivariate polynomials, and/or
at least one polynomial of the public set has a degree of at least two in one of the two variables of said at least one polynomial.

3. The public key encryption device as claimed in claim 1, wherein
the public univariate polynomial is represented as a list of coefficients of the public univariate polynomial in a canonical form, and
the decrypting univariate polynomial is represented as a list of coefficients of the decrypting univariate polynomial in a canonical form.

4. The public key encryption device as claimed in claim 1, wherein
a public global reduction integer is associated with the public set and a public individual reduction integer with each polynomial of the public set,
the private random value and the encrypting random value are integers, each polynomial in the public set is a bivariate polynomial with integer coefficients, the public univariate polynomial and decrypting univariate polynomial are univariate polynomials with integer coefficients,
and wherein
computing the symmetric key comprises substituting the encrypting random value in the public univariate polynomial and reducing modulo the global reduction integer,
computing the decrypting univariate polynomial comprises
obtaining a set of univariate polynomials by
for each polynomial of the public set substituting the private encrypting value into the polynomial and reducing modulo the public individual reduction integer associated with said polynomial, and
summing the set of univariate polynomials and reducing modulo the global reduction integer.

5. The public key encryption device as claimed in claim 4, wherein
the public global reduction integer is an odd number larger than $2^{(\alpha+2)b-1}$ and/or lower than $2^{(\alpha+2)b}$, wherein $\alpha$ represents the highest degree in one of the two variables of the polynomials in the public set, and b represents a key length, and
for each public individual reduction integer, the public global reduction integer (N) minus said public individual reduction integer is a multiple of 2 to the power of the key length ($q_i = N - \beta_i 2^b$, $1 \leq \beta_i < 2^b$) and is less than 2 to the power of twice the key length,
and wherein computing the symmetric key further comprises reducing modulo 2 to the power of the key length.

6. The public key encryption device as claimed in claim 1, wherein, in the private key decryption device, the decryption information comprises key confirmation data computed from the symmetric key for verifying if a reconstructed key equals said symmetric key, the decryption information comprising the key confirmation data, and wherein
reconstructing the symmetric key comprises
deriving a first reconstructed key from the result of substituting the private random value in the decrypting univariate polynomial and reducing modulo the public global reduction integer,
determining from the key confirmation data if the first reconstructed key equals the symmetric key and if not deriving a further reconstructed key from the first reconstructed key.

7. The public key encryption device as claimed in claim 6, wherein, in the private key decryption device, reconstructing the symmetric key comprises substituting the private random value in the decrypting univariate polynomial and reducing modulo the public global reduction integer, wherein deriving a further reconstructed key comprises adding the public global reduction integer or a multiple of the public global reduction integer to the first reconstructed key and reducing modulo the 2 to the power of the key length ($2^b$).

8. The public key encryption device as claimed in claim 1, wherein
- a public global reduction polynomial is associated with the public set and public individual reduction polynomials with each polynomial of the public set,
- the private random value and the encrypting random value are polynomials, each particular polynomial in the public set is a bivariate polynomial with coefficients taken from the polynomial ring modulo the public individual reduction polynomial associated with the particular polynomial,
- the public univariate polynomial and decrypting univariate polynomial have polynomial coefficients, and wherein
- computing the symmetric key comprises substituting the encrypting random value in the public univariate polynomial and reducing modulo the global reduction polynomial,
- computing the decrypting univariate polynomial comprises
  - obtaining a set of univariate polynomials by
    - for each polynomial of the public set substituting the private encrypting value into the polynomial and reducing modulo the public individual reduction polynomial associated with said polynomial, and
  - summing the set of univariate polynomials.

9. A public key encryption method for encrypting an electronic message using a public key performed by resource-constrained devices such as a sensor, a lighting device, a LED lamp, a smart card, or an RFID tag within a lighting network, the public key comprising a public univariate polynomial and a public set of bivariate polynomials, wherein a different commutative ring is associated with each polynomial of the public set of bivariate polynomials, said public key encryption method comprising:
- obtaining, in electronic form, an encrypting random value;
- computing a symmetric key by substituting the encrypting random value in the public univariate polynomial;
- computing a decrypting univariate polynomial by summing over univariate polynomials obtained by substituting the encrypting random value into the polynomials of the public set, the univariate polynomial obtained by substituting the encrypting random value into a particular polynomials of the public set is reduced to a canonical form in the commutative ring associated with the particular univariate polynomial;
- generating the decryption information, the decryption information comprising the decrypting univariate polynomial; and
- encrypting the message with the symmetric key and associating said encrypted message with the decryption information.

10. A computer program embodied on a non-transitory computer-readable medium, comprising computer program code for causing a computer, when the computer program is run on the computer, to perform a public key encryption method for encrypting an electronic message using a public key performed by resource-constrained devices such as a sensor, a lighting device, a LED lamp, a smart card, or an RFID tag within a lighting network, the public key comprising a public univariate polynomial and a public set of bivariate polynomials, wherein a different commutative ring is associated with each polynomial of the public set of bivariate polynomials, said public key encryption method comprising:
- obtaining, in electronic form, an encrypting random value;
- computing a symmetric key by substituting the encrypting random value in the public univariate polynomial;
- computing a decrypting univariate polynomial by summing over univariate polynomials obtained by substituting the encrypting random value into the polynomials of the public set, the univariate polynomial obtained by substituting the encrypting random value into a particular polynomials of the public set is reduced to a canonical form in the commutative ring associated with the particular univariate polynomial;
- generating the decryption information, the decryption information comprising the decrypting univariate polynomial; and
- encrypting the message with the symmetric key and associating said encrypted message with the decryption information.

* * * * *